(12) United States Patent
Munda et al.

(10) Patent No.: US 10,746,015 B2
(45) Date of Patent: Aug. 18, 2020

(54) OIL AND GAS INDUSTRIAL MACHINE MONITORING

(71) Applicant: GE Inspection Technologies, LP, Lewistown, PA (US)

(72) Inventors: Robert Munda, Schnectady, NY (US); Nimrod Ohad, Schnectady, NY (US); Arun Subramaniyan, Niskayuna, NY (US)

(73) Assignee: GE Sensing & Inspection Technologies, GmbH, Lewistown, PA (US)

( * ) Notice: Subject to any disclaimer, the term of this patent is extended or adjusted under 35 U.S.C. 154(b) by 0 days.

(21) Appl. No.: 15/991,650

(22) Filed: May 29, 2018

(65) Prior Publication Data
US 2018/0340411 A1    Nov. 29, 2018

Related U.S. Application Data

(60) Provisional application No. 62/576,636, filed on Oct. 24, 2017, provisional application No. 62/512,157, filed on May 29, 2017.

(51) Int. Cl.
*E21B 47/00*    (2012.01)
*G01V 3/38*    (2006.01)
(Continued)

(52) U.S. Cl.
CPC .......... *E21B 47/0007* (2013.01); *E21B 44/00* (2013.01); *G01V 3/34* (2013.01);
(Continued)

(58) Field of Classification Search
None
See application file for complete search history.

(56) References Cited

U.S. PATENT DOCUMENTS 8,005,733 B2 *   8/2011   Subbu .................... G06Q 10/00
                                                        705/35
2009/0132458 A1 *  5/2009  Edwards ................. E21B 44/00
                                                        706/50
(Continued)

*Primary Examiner* — Curtis A Kuntz
*Assistant Examiner* — Jerold B Murphy
(74) *Attorney, Agent, or Firm* — Mints Levin Cohn Ferris Glovsky and Popeo, P.C.

(57) ABSTRACT

A monitoring system can include a dashboard including a graphical user interface display space. The monitoring system can also include a digital twin validation (DTV) system. The DTV system can be configured to perform operations including rendering, in the graphical user interface display space, a visual representation of an output value of a digital model of an oil and gas industrial machine, and an interactive graphical object characterizing an input value of the digital model. The operations can also include receiving data characterizing user interaction with the interactive graphical object. The data characterizes the user interaction indicative of the input value of the digital model. The operations can also include updating the digital model to generate an updated output value representative of an operational characteristic of the oil and gas industrial machine. The operations can further include rendering, in the graphical user interface display space, a visual representation of the updated output value.

19 Claims, 25 Drawing Sheets

(51) Int. Cl.
*G01V 3/34* (2006.01)
*G06F 3/0484* (2013.01)
*E21B 44/00* (2006.01)
*G01V 99/00* (2009.01)

(52) U.S. Cl.
CPC ............ *G01V 3/38* (2013.01); *G06F 3/04847* (2013.01); *G01V 99/00* (2013.01)

(56) References Cited

U.S. PATENT DOCUMENTS

| | | | |
|---|---|---|---|
| 2010/0147589 A1* | 6/2010 | Wingky | E21B 44/00 175/40 |
| 2014/0310634 A1* | 10/2014 | McLellan | G06F 3/04847 715/771 |
| 2015/0107901 A1* | 4/2015 | Eriksson | E21B 41/00 175/40 |
| 2015/0129306 A1* | 5/2015 | Coffman | E21B 49/003 175/25 |
| 2018/0106134 A1* | 4/2018 | Meehan | G05B 19/0426 |
| 2019/0003297 A1* | 1/2019 | Brannigan | E21B 7/00 |

* cited by examiner

WELL INSTANCE

UPDATED: 04/16/2015 01:28:00 PM EST

HUDSON WELL

1302 → HUDSON WELL   STATE: [ACTIVE ˅]

STATUS: [NOT PRODUCING] — 1306

CLASS         SUB CLASS
WELL          ESP

DESCRIPTION                                    SOURCE ID
REPRESENTS AN OIL WELL                         WELL-0F3CAD26-9C2A-4A39-ACB5-CC26C0F5DB44

ATTRIBUTES  LOCATION  LIFT TYPE  COMMUNICATION PATH  TAGS  <u>CONTROLS</u>  SET POINTS

WELL ACTION
①
[START WELL] — 1308

FREQUENCY
②

PLEASE NOTE: IT CAN TAKE UP TO 5 MINUTES TO FULLY STOP THE WELL. DURING THIS TIME ADDITIONAL TEXT DESCRIBING WHAT IS HAPPENING

PLEASE NOTE: ADJUSTING THE FREQUENCY CAN ONLY BE DONE AT MAXIMUM INCREMENTS OF -1 OR +1 Hz AT A TIME.

CURRENT FREQUENCY: 60.1Hz   1304

[−]  [60.1]  [+]  [UPDATE FREQUENCY]

Sidebar:
- DASHBOARD
- ALERTS
- ANALYSIS
- CASES
- ASSETS
- ASSET INSTANCES
- GROUPS
- CLASSIFICATIONS

FIG. 13

| SELECT | STATUS | TYPE | ASSET NAME | LIQUID (BBLD) | OIL (BBLD) | WATER CUT (%) | ENERGY (KWH) | PUMP UPTIME (%) | GATH. CENTER |
|---|---|---|---|---|---|---|---|---|---|
| ☐ | O | ESP | OPTIMA WELL 5A | ↓1322 | ↓119 | ↑91 | ↑46 | 94 | 11 |
| ☐ | O | RLS | SHARP WELL 14B | ↓752 | ↓45 | ↓94 | ↑26 | 93 | 15 |
| ☐ | O | RLS | REUBEN WELL 16B | ↓978 | ↓812 | ↓17 | ↑25 | 80 | 13 |
| ☐ | O | RLS | ROCK HORSE WELL 11A | ↓553 | ↓50 | ↑91 | ↓31 | 95 | 15 |
| ☐ | O | ESP | EDISON WELL 12B | ↑1839 | ↑1324 | ↑28 | ↑36 | 85 | 11 |
| ☐ | O | RLS | REUBEN WELL 15A | ↓607 | ↓358 | ↑41 | ↓44 | 95 | 26 |
| ☐ | O | ESP | MIDLAND WELL 6B | ↓1962 | ↓491 | ↑75 | ↓42 | 98 | 13 |
| ☐ | O | ESP | OPTIMA WELL 15A | ↑1866 | ↓1623 | ↑13 | ↓39 | 93 | 15 |
| ☐ | O | ESP | SIDETRACK WELL 3A | ↑1510 | ↑378 | ↑75 | ↑29 | 92 | 15 |
| ☐ | O | ESP | MIDLAND WELL 2F | ↑1315 | ↑302 | ↑77 | ↑35 | 91 | 15 |
| ☐ | O | RLS | GOOSE CREEK WELL 18B | ↓780 | ↓429 | ↑45 | ↑36 | 97 | 15 |
| ☐ | O | ESP | MIDLAND WELL 7B | ↓1762 | ↓1181 | ↓33 | ↑41 | 95 | 15 |
| ☐ | O | ESP | MAXFLOW WELL 8B | ↑1410 | ↑183 | ↑87 | ↓41 | 92 | 13 |
| ☐ | O | ESP | OPTIMA WELL 6A | ↑1816 | ↓1035 | ↓43 | ↑43 | 80 | 13 |
| ☐ | O | ESP | OPTIMA WELL 6B | ↑1985 | ↑1667 | ↑16 | ↑44 | 90 | 15 |
| ☐ | O | ESP | SIDETRACK WELL 13A | ↑1431 | ↑386 | ↑73 | ↑31 | 92 | 13 |
| ☐ | O | ESP | EDISON WELL 2A | ↑1857 | ↓1021 | ↓45 | ↑44 | 97 | 15 |
| ☐ | O | ESP | WELCH WELL 9A | ↑1187 | ↓926 | ↑22 | ↑30 | 96 | 15 |
| ☐ | O | ESP | SIDETRACK WELL 4A | ↑1167 | ↑12 | ↑99 | ↑38 | 95 | 33 |
| ☐ | O | ESP | SIDETRACK WELL 4B | ↑1638 | ↑753 | ↑54 | ↑30 | 93 | 33 |
| ☐ | O | ESP | EDISON WELL 2B | ↑1805 | ↓1227 | ↓32 | ↓28 | 96 | 15 |

FIG. 17

OIL AND GAS INDUSTRIAL MACHINE MONITORING

RELATED APPLICATION

This application claims priority under 35 U.S.C. § 119(e) to U.S. Provisional Patent Application No. 62/512,157 filed on May 29, 2017, and to U.S. Provisional Patent Application No. 62/576,636 filed on Oct. 24, 2017, the entire contents of each of which are hereby expressly incorporated herein.

BACKGROUND

A field, such as an oil or gas field, is a region suitable for oil or gas extraction due to its proximity to an oil or gas reservoir. An oil field, for example, can include multiple oil wells that can include borings that can extend from earth's surface to the oil reservoir. Crude oil and/or natural gas can be extracted through the oil well, for example, by oil pumps (e.g., Electrical Submersible Pump (ESP), Surface Pumping Systems (SPS), and the like). Oil pumps can create a pressure differential that can force crude oil and/or natural gas to flow from one region (e.g., reservoir) to another.

An oil pump can be a complex system with multiple operational parameters (e.g., pump speed, pump temperature, and the like). The operational parameters can be controlled by a control system. The control system can receive information related to the operational parameters of the oil pump through one or more sensors configured to detect the operational parameters. The control system can also alter the operational parameters of the oil pump, for example, by sending a control signal to the oil pump. The control system can interface with a monitoring system, which can be remotely located, can be configured to receive information (e.g., sensor data) from the control system, and provide instructions to the control system to vary the operational parameters of the oil pump.

SUMMARY

Industrial machine (e.g., oil well) monitoring systems and methods are provided. In one embodiment, an oil well monitoring system can render, in a graphical user interface display space, a visual representation of an output value of a digital model of a well, and an interactive graphical user object of an input value of the digital model. The oil well monitoring system can receive data characterizing user interaction with the interactive graphical object, and update, using the received data as a new input value, the digital model to generate an updated output value. The oil well monitoring system can also render, in the graphical user interface display space, a visual representation of the updated output value and an interactive graphical object of the new input value.

Various aspects of the disclosed subject matter may provide one or more of the following capabilities. The oil well monitoring system can improve production of crude oil of an oil well by controlling the operating parameters of an oil pump in the oil well. The oil pump can be a complex machine with multiple operational parameters. As a result, a user of the monitoring system may not be able to efficiently adjust the operational parameters values to improve the performance of the oil pump. In some implementations, the monitoring system described herein can provide the user with recommendations (e.g., for values of operational parameters) and simulate crude oil production based on inputs provided by the user.

In an exemplary embodiment, a method can include rendering, in a graphical user interface display space, a visual representation of an output value of a digital model of an oil and gas industrial machine, and an interactive graphical object characterizing an input value of the digital model. The method can also include receiving data characterizing user interaction with the interactive graphical object. The data characterizing the user interaction can be indicative of the input value of the digital model. The method can also include updating the digital model to generate an updated output value representative of an operational characteristic of the oil and gas industrial machine. The method can further include rendering, in the graphical user interface display space, a visual representation of the updated output value.

One or more of the following features can be included in any feasible combination.

In one embodiment, the digital model can be configured to calculate the output value based on a characteristic mathematical representation of the oil and gas industrial machine. The characteristic mathematical representation can include a system of equations that calculates the output value based, at least in part, on the data characterizing the user interaction indicative of the input value. In another embodiment, updating the digital model can include updating at least one variable in the system of equations based on the input value and evaluating the updated model to determine the updated output value. In yet another embodiment, the interactive graphical object can include a slide bar configured to be dragged along a predetermined path, wherein the location of the slide bar on the predetermined path indicative of the input value.

In one embodiment, the input value can further represent one or more operational parameters of the oil and gas industrial machine and/or predetermined system coefficients of the oil and gas industrial machine. In another embodiment, the method can further include updating the predetermined system coefficient based on data characterizing user interaction with the interactive graphical object. In yet another embodiment, the oil and gas industrial machine can include one or more of a crude distillation unit, control valves, a reservoir, a casing unit, pumps and tubing unit.

In one embodiment, the method can further include communicating data characterizing one or more of the digital model, the input value and the updated output value to a global monitoring system configured to monitor the oil and gas industrial machine. In another embodiment, the method can further include transmitting, to a controller of the oil and gas industrial machine, an instruction to modify operation of the industrial machine, the instruction based on the received data.

In one embodiment, the method can further include generating, using a recommendation engine, a recommended value for the input value and rendering, in the graphical user interface display space, a visual representation of the recommended value. In another embodiment, the oil and gas industrial machine is in communication with a machine monitoring platform including the digital model, the communication is via an edge device coupled to an oil and gas machine controller and the edge device is configured to communicate with the machine monitoring platform via a secure socket connection without the edge device opening a listening port.

In an exemplary embodiment, a system can include at least one data processor and a memory coupled to the at least one data processor. The memory can store instructions to cause the at least one data processor to perform operations including rendering, in a graphical user interface display space, a visual representation of an output value of a digital model of an oil and gas industrial machine, and an interactive graphical object characterizing an input value of the digital model. The operations can include receiving data characterizing user interaction with the interactive graphical object, the data characterizing the user interaction indicative of the input value of the digital model. The operations can also include updating the digital model to generate an updated output value representative of an operational characteristic of the oil and gas industrial machine. The operations can further include rendering, in the graphical user interface display space, a visual representation of the updated output value.

One or more of the following features can be included in any feasible combination.

In one embodiment, the digital model can be configured to calculate the output value based on a characteristic mathematical representation of the oil and gas industrial machine. The characteristic mathematical representation can include a system of equations that calculates the output value based, at least in part, on the data characterizing the user interaction indicative of the input value. In another embodiment, updating the digital model can include updating at least one variable in the system of equations based on the input value and evaluating the updated model to determine the updated output value. In yet another embodiment, the interactive graphical object can include a slide bar configured to be dragged along a predetermined path, wherein the location of the slide bar on the predetermined path indicative of the input value.

In one embodiment, the input value can further represent one or more operational parameters of the oil and gas industrial machine and/or predetermined system coefficients of the oil and gas industrial machine. In another embodiment, the operations can further include updating the predetermined system coefficient based on data characterizing user interaction with the interactive graphical object. In yet another embodiment, the oil and gas industrial machine can include one or more of a crude distillation unit, control valves, a reservoir, a casing unit, pumps and tubing unit.

In one embodiment, the operations can further include communicating data characterizing one or more of the digital model, the input value and the updated output value to a global monitoring system configured to monitor the oil and gas industrial machine.

In one implementation, a monitoring system can include a dashboard including a graphical user interface display space. The monitoring system can also include a digital twin validation (DTV) system. The DTV system can be configured to perform operations including rendering, in the graphical user interface display space, a visual representation of an output value of a digital model of an oil and gas industrial machine, and an interactive graphical object characterizing an input value of the digital model. The operations can also include receiving data characterizing user interaction with the interactive graphical object. The data characterizing the user interaction can be indicative of the input value of the digital model. The operations can also include updating the digital model to generate an updated output value representative of an operational characteristic of the oil and gas industrial machine. The operations can further include rendering, in the graphical user interface display space, a visual representation of the updated output value.

These and other capabilities of the disclosed subject matter will be more fully understood after a review of the following figures, detailed description, and claims.

BRIEF DESCRIPTION OF THE FIGURES

These and other features will be more readily understood from the following detailed description taken in conjunction with the accompanying drawings, in which:

FIG. 8B illustrates an exemplary global view heatmap of the dashboard overview interface in FIG. 7;

FIG. 10 illustrates an exemplary alert details interface of the graphical user interface display in FIG. 2;

FIG. 13 illustrates an exemplary controls interface of the graphical user interface display in FIG. 2;

FIG. 17 illustrates an exemplary graphical user interface display of a digital twin validation that includes information of a plurality of oil wells;

DETAILED DESCRIPTION

An oil and/or gas well can include a system that extracts oil and/or gas from the ground using, for example, a pump.

Production of crude oil (or natural gas) from the oil well can be improved by changing the operation of the pump. Changing the operation of the pump can include changing, for example, speed/frequency of rotation of a motor in the oil pump, pressure applied by the oil pump on crude oil, and the like. But, trying to improve the oil production by manually varying the operation can be cumbersome. And some approaches to operating the oil pump can adversely affect the oil pump. For example, setting the speed/frequency of the motor in the pump above a threshold value can reduce the lifetime of the motor. And that threshold may be dynamic, for example, vary with other characteristics of the well, such as down hole pressure. To guide the user in improving oil production, an intuitive interface can allow a user to simulate changes in how an oil well would operate if the operator changed one or more operating parameters such as pump speed. By simulating well operation, an operator can explore making hypothetical changes to the well operation without having to actually modify operation of the well. In addition, the interface can automatically provide recommendations for how to modify the oil well to achieve an increase in production. Additionally, the user can remotely alter oil well operation, such as altering the operation of the pump. This remote modification of the oil well can be based on the hypothetical change in operation used in the simulation. Other embodiments are within the scope of the disclosure.

Figure 1:
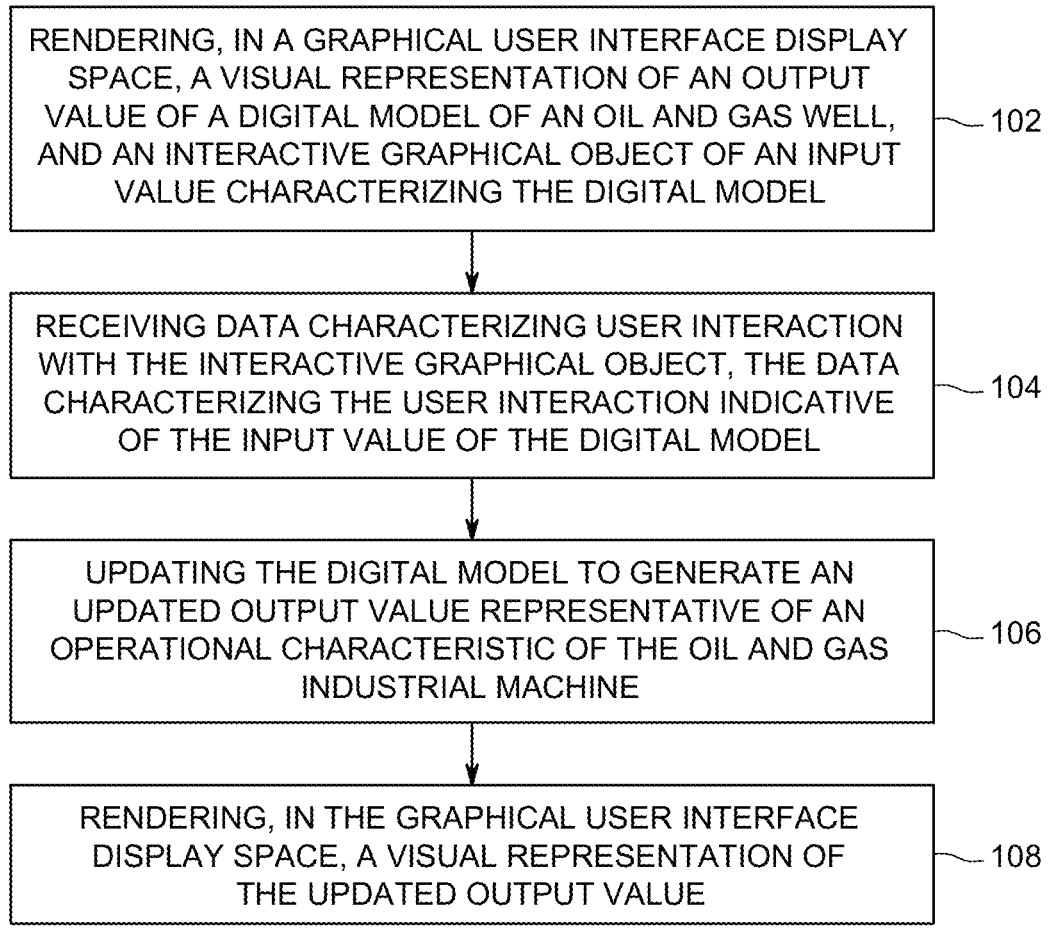
FIG. 1 is a flow chart of an exemplary method for monitoring operations of an oil well.

FIG. 1 is a flow chart of an exemplary method for monitoring and managing the operation of an oil and gas industrial machine (e.g., oil pump associated with an oil well). At 102, a visual representation of an output value of a digital model of the oil and gas industrial machine can be rendered in a graphical user interface (GUI) display space. The output value can include, for example, operational characteristics of the oil and gas industrial machine (e.g., pump characteristics of the well), raw measurement data from sensors coupled with the oil and gas industrial machine, and the like. The operational characteristics can be calculated using the digital model by a monitoring system configured to monitor the operation of the oil and gas industrial machine (e.g., monitoring system 500 in FIG. 5). For example, a digital twin representing an oil well can include a system of equations that characterize the oil well. For example, an oil well can be represented, in part, by the following system of equations:

$$D = a_0 + a_1 x + a_2 x^2 + \ldots$$

$$S = b_0 + b_1 D + b_2 x^2 + \ldots$$

$$V = c_0 + c_1 S + c_2 D + c_3 x^2 + \ldots$$

where, for example, "D" represents density, "S" represents surface tension, "V" represents viscosity, "x" represents input data (e.g., data provided by a user, detected by a sensor associated with the oil and gas industrial machine, and the like). The system of equations can be coupled (e.g., output of a first equation can be used as an input to a second equation in the system of equations). The system of equations can allow for determination of density, surface tension and viscosity from input data and system coefficients (e.g., $a_0, a_1, a_2, b_0, b_1, b_2, c_0, c_1, c_2, c_3$, and the like). The input data and system coefficients can be determined, for example, based on predetermined values in a database, input provided by a user, measurement from a sensor coupled to the oil and gas industrial machine, and the like. The visual representation of the output value can include, for example, a plot of the calculated pump characteristics with respect to an operational parameter of the oil and gas industrial machine.

At 102, an interactive graphical object characterizing an input value of the digital model can also be rendered in the GUI display space. For example, the GUI display space can represent a sliding bar (e.g., sliding bars 212 and 214 in FIG. 2) that a user can slide (e.g., by clicking and dragging along a predetermined path) to enter an input value. The location of the sliding bar can be representative of the input value which can be indicative of an operational parameter of the oil and gas industrial machine. The GUI display space can include recommendations for desirable input operational parameter values for the oil and gas industrial machine. The recommendations can be presented, for example, as visual indicators (e.g., arrows, lines, highlight, and the like) for a desirable location of the sliding bar along a bar gauge.

Figure 2:
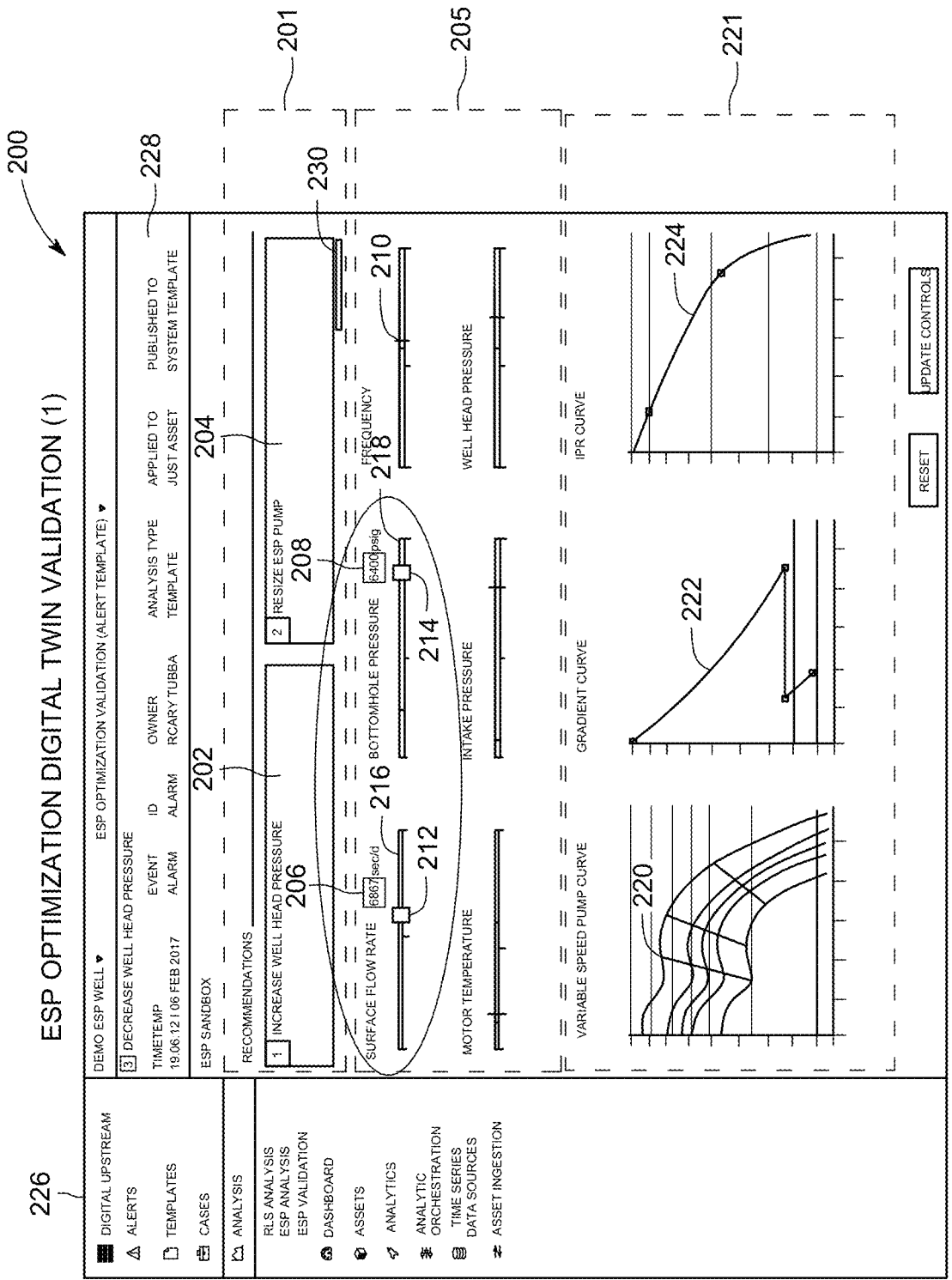
FIG. 2 illustrates an exemplary graphical user interface display of a digital twin validation.

FIG. 2 illustrates an exemplary graphical user interface display 200 of the monitoring system. The GUI 200 includes a recommendation section 201, an operational parameters section 205, and a characteristics or output section 221.

The recommendation section 201 can include recommendations 202 and 204 (which can be presented close to the top of the GUI display) for improving the performance of the oil pump (e.g., "Increase Well Head Pressure," "Resize ESP pump," and the like). The recommendations can also include the likely result (e.g., on the crude oil production) of the recommendation. As shown in FIG. 2, by decreasing the well head pressure (WHP) to 37.9 psig, crude oil production can be increased by additional 1705.1 standard barrel per day (stb/d).

The operational parameters section 205 can include the current values 206 and 208 (and/or range of possible values) for the various operational parameters (e.g., surface flowrate, bottomhole pressure, pump frequency, motor temperature, intake temperature, well head pressure, and the like). The current value can be represented by a vertical black line 210 on a bar gauge representative of the operational parameter. The current value can be representative of the value of the operational parameter measured by a sensor coupled with the oil well. FIG. 2 illustrates that the current surface flowrate is 6867 stb/d, and the current bottomhole pressure is 6400 psig. The GUI display can also provide sliding bars 212 and 214 that can slide along the bar gauges 216 and 218 to vary one or more operational parameters. For example, in FIG. 2, sliding bars are provided for surface flowrate and bottomhole pressure.

The output section 221 can include information related to the pump characteristics (which may have been calculated using by the DTV system). The information can be displayed in the form of a plot of the pump characteristics versus operational parameter values. For example, in FIG. 2, variable speed pump curve 220, gradient curve 222, input performance relation (IPR) curve 224 have been plotted with respect to flow rate, pressure and flow rate, respectively.

Variable speed pump curve 220 can include a plot of head (e.g., in feet) versus flow rate (stb/d). The latest operating point can be illustrated as a circle. Head curves for different pump frequencies can be plotted as well as the best efficient point (BEP) and operating range.

Gradient curve 222 can include a plot of true vertical depth (e.g., in feet) versus pressure (e.g., in pounds per square inch gauge (psig)). The latest operating point can be illustrated as well as reservoir pressure and bubble point.

IPR curve 224 can include a plot of flow pressure (e.g., in pounds per square inch gauge (psig)) versus flow rate (e.g., stb/d). The latest operating point as well as bubble point is illustrated.

The GUI interface can include a vertical taskbar 226 that can allow the user to navigate through various features of the interface. The vertical taskbar can include icons that can take the user to, for example, interfaces for "Alerts", "Templates," "Analysis," "dashboard," and the like The GUI interface can also include a horizontal taskbar 228 that can include information related to the nature of the current GUI (e.g, alarm, analysis, and the like), current date and time, identification of the oil well under observation, and the like The GUI interface can also include a hyperlink 230 that can allow the user to access recommendations generated by the monitoring system in the past.

While a specific example GUI 200 has been illustrated in FIG. 2, other implementations are possible. For example, the recommendation section 201, an operational parameters section 205, and a characteristics or output section 221 can be positioned in various arrangements and the sections 201, 205, 221 can include different visual representations, graphical objects, and the like, from what is illustrated in FIG. 2.

Referring again to FIG. 1, at 104, data characterizing user interaction (e.g., clicking and dragging of the sliding bar) with the interactive graphical object can be received. For example, the GUI display space can receive, the value of an operational parameter obtained through the user interaction. For example, a user can move the sliding bar 212 and/or 214 in FIG. 2. Based on the received operational parameter value, a signal that includes information related to the received operational parameter can be generated.

At 106, the digital model can update, using the received data as a new input value, to generate an updated output value. For example, the monitoring system (e.g., monitoring system 500) can recalculate pump characteristics using the digital model that takes the received data (e.g., representing input values of the operational parameters from the user) as inputs. Updating can include evaluating the digital model with the received inputs. By evaluating the digital model with the user provided inputs, pump characteristics can be determined for hypothetical operations of the pump.

At 108, the GUI display space can render, in the graphical user interface display space, a visual representation of the updated output value and an interactive graphical object of the new input value. For example, the dashboard can present, via the GUI, the recalculated pump characteristics. These recalculated pump characteristics can be rendered, for example, in the GUI display space illustrated in FIG. 2.

Figure 3:
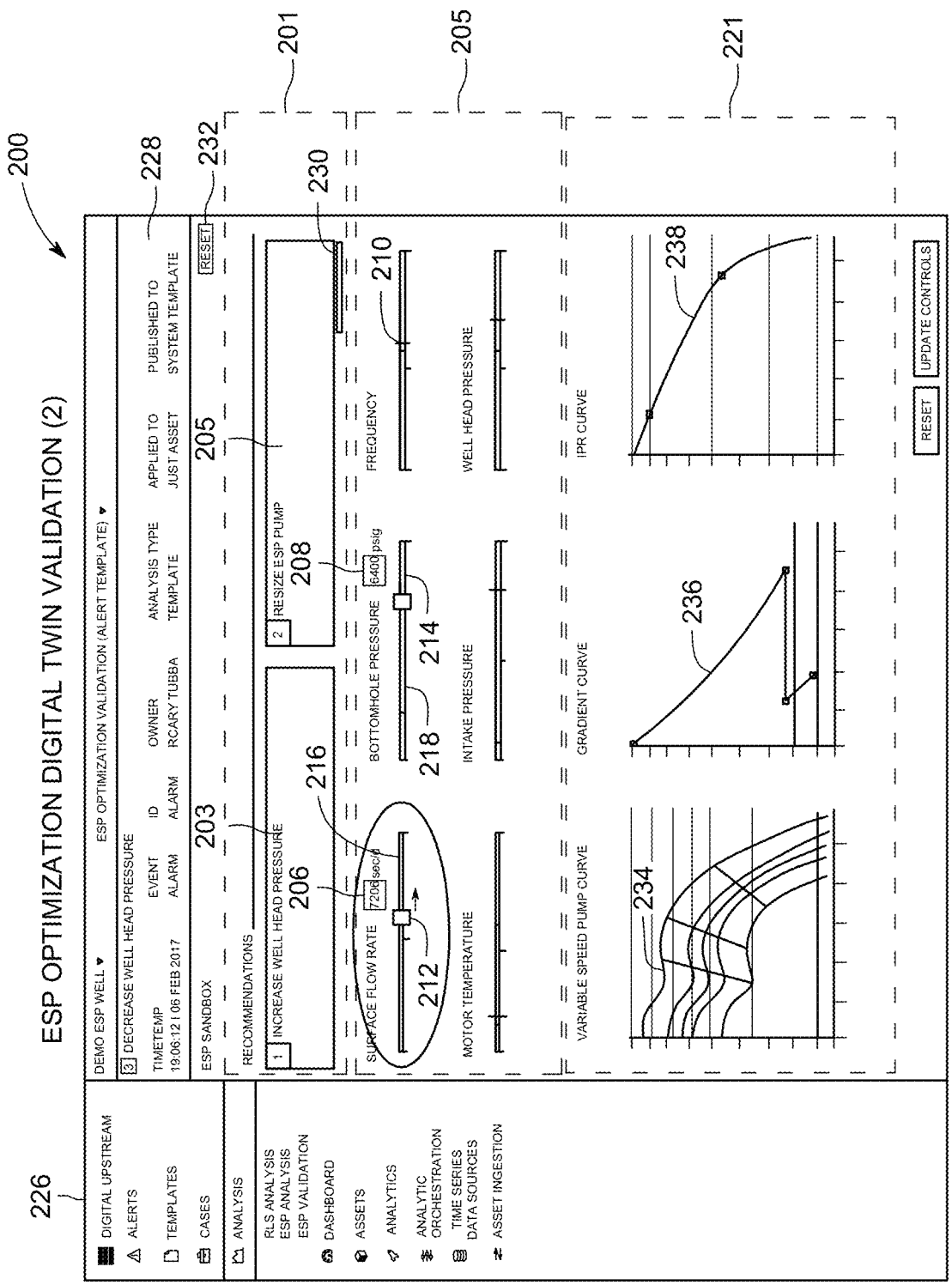
FIG. 3 illustrates the graphical user interface display of FIG. 2 where inputs to the digital twins have been adjusted by a user.

FIG. 3 illustrates the graphical user interface display of FIG. 2 where inputs to the DTV system have been adjusted by a user. For example, the user can adjust the surface flow rate to 7200 stb/d from 6867 stb/d by dragging the slide bar 212 to the right (e.g., along a predetermined path). The location of the slide bar 212 can be indicative of, for example, an operation parameter of the industrial machine (e.g., oil and gas industrial machine). After changing the surface flow rate, the user can click on the "Reset" button 232 that instructs the DTV system to recalculate pump characteristics based on the new input value (or values). Additionally, the recommendation engine can generate revised recommendations 203 and 204 based on the pump characteristics calculated by the DTV system. The recalculated pump characteristics can be presented as a plot (e.g., plots 234, 236, 238, etc.) of the recalculated pump characteristics against an operational parameter (e.g., the operational parameter related to the input value from the user). Plots of variable speed pump curve 234, gradient curve 236, and IPR curve 238 can be updated forms of plots 220, 222, and 224, respectively.

Figure 4:
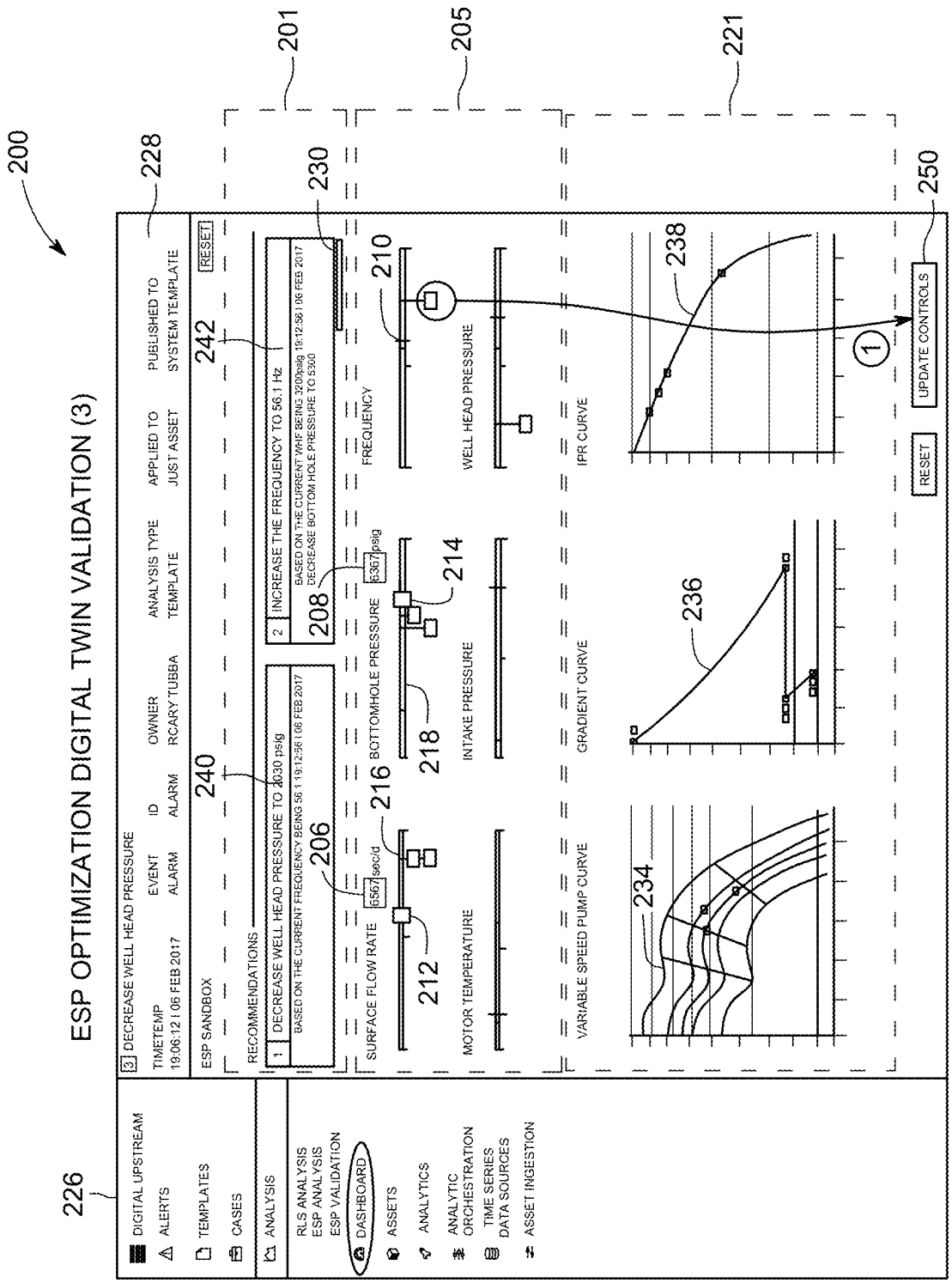
FIG. 4 illustrates the graphical user interface display of FIG. 2 including recommendation from the digital twins based on the inputs provided by the user in FIG. 3.

FIG. 4 illustrates the graphical user interface display of FIG. 2 that can include the recalculated pump characteristics (e.g., plots 234, 236, 238, etc.) and revised recommendations (e.g., 240, 242, etc.) generated by the recommendation engine. The recommendation engine can include a rules engine that receives the digital model outputs and generates a recommendation according to a rule set. The recommendations can present to the user a "What if approach" that can allow the user to simulate various scenarios having different combinations of operating parameters values and monitor the resulting crude oil production. For example, as shown in FIG. 4, the GUI 200 can include two recommendations (which can be color coded): (1) "Decrease Well Head Pressure to 2000 psig" 240 (represented using red color) and (2) "Increase the Frequency to 56.1 Hz" 242 (represented using blue color). The first recommendation can include setting the operating frequency to 54.2 hertz and altering the well head pressure to achieve a flow rate of 7200 stb/d for the crude oil. The second recommendation can include setting the well head pressure to a constant value, and varying the operating pump frequency to achieve a flow rate of 7200 stb/d for the crude oil.

The user can choose one of the many recommendations based on his/her experience. For example, the user may choose to change the operational parameters of the oil pump in the oil well based on the second recommendation. This can be done, for example, by selecting the second recommendation (e.g., by clicking on the dialog box of the second recommendation) and clicking on the "Update Control" button 250. This can select the operational parameter values based on the second recommendation, and send a control signal to a control system associated with the oil pump which can alter the operational parameters of the oil pump.

Figure 5:
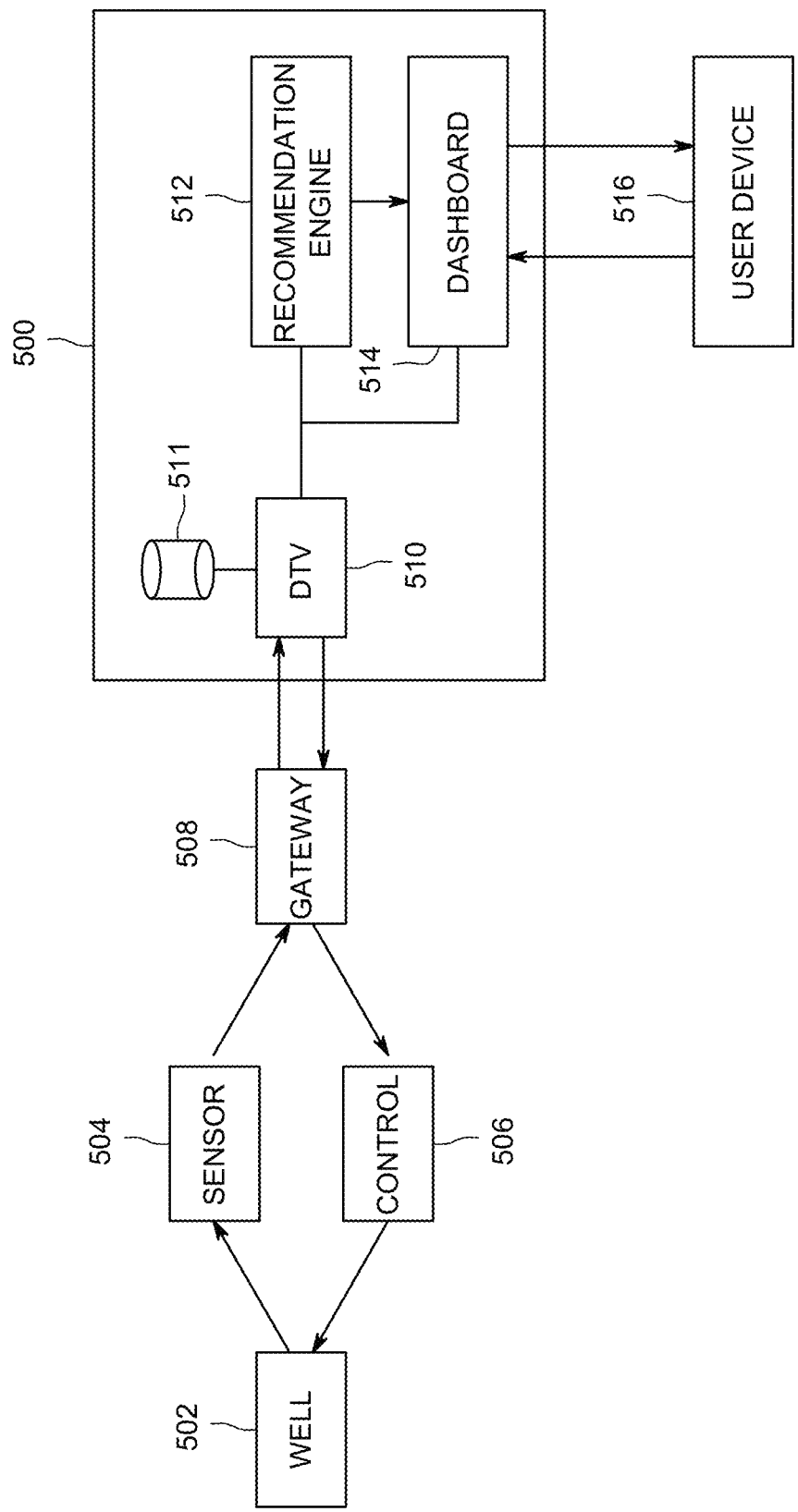
FIG. 5 illustrates and exemplary embodiment of a system block diagram of a monitoring system that can communicate with an oil well.

FIG. 5 illustrates and exemplary embodiment of a system block diagram of a monitoring system 500 that can communicate with an oil well 502. The monitoring system 500 can operationally couple to an oil well 502, for example, via sensors 504 and control system 506 associated with the oil well 502. The sensors 504 and control system 506 can communicate with the monitoring system 500 via a gateway 508 (e.g., a router). The monitoring system 500 can include a DTV system 510, a recommendation engine 512 and a dashboard 514. The recommendation engine 512 can include a rules engine that receives the digital model outputs and generates a recommendation according to a rule set.

Sensors 504 can include any type of sensor that can be incorporated into an industrial machine such as pressure sensor, vibration sensor, temperature sensor, humidity sensor, and the like. As an example, an oil well can include sensors measuring pump frequency, pressure, temperature, and the like.

Control system 506 can include a controller operably coupled with the oil well. The control system 506 can alter the operational parameters of the oil pump, for example, by changing the frequency of the pump.

The DTV system 510 can receive operational parameters detected by the sensors 504, and transmit control signal to the control system 506. The DTV system 510 can calculate pump characteristics based on the received operational parameter and system coefficients which can be stored in a memory device 511. The DTV system 510 can also communicate with the recommendation engine 512 (e.g., provide pump characteristics) and the dashboard 514 (e.g., provide the dashboard 514 with operating parameters and pump characteristics, and receive from the dashboard 514 with new inputs provided by the user). The recommendation engine 512 can also communicate with the dashboard 514

(e.g., provide the dashboard 514 with recommendations). The dashboard 514 can communicate with a graphical user interface in a user device 516 (e.g., receive inputs from the GUI and provide recommendations, operating parameters and pump characteristics to the user device 516).

Figure 6:
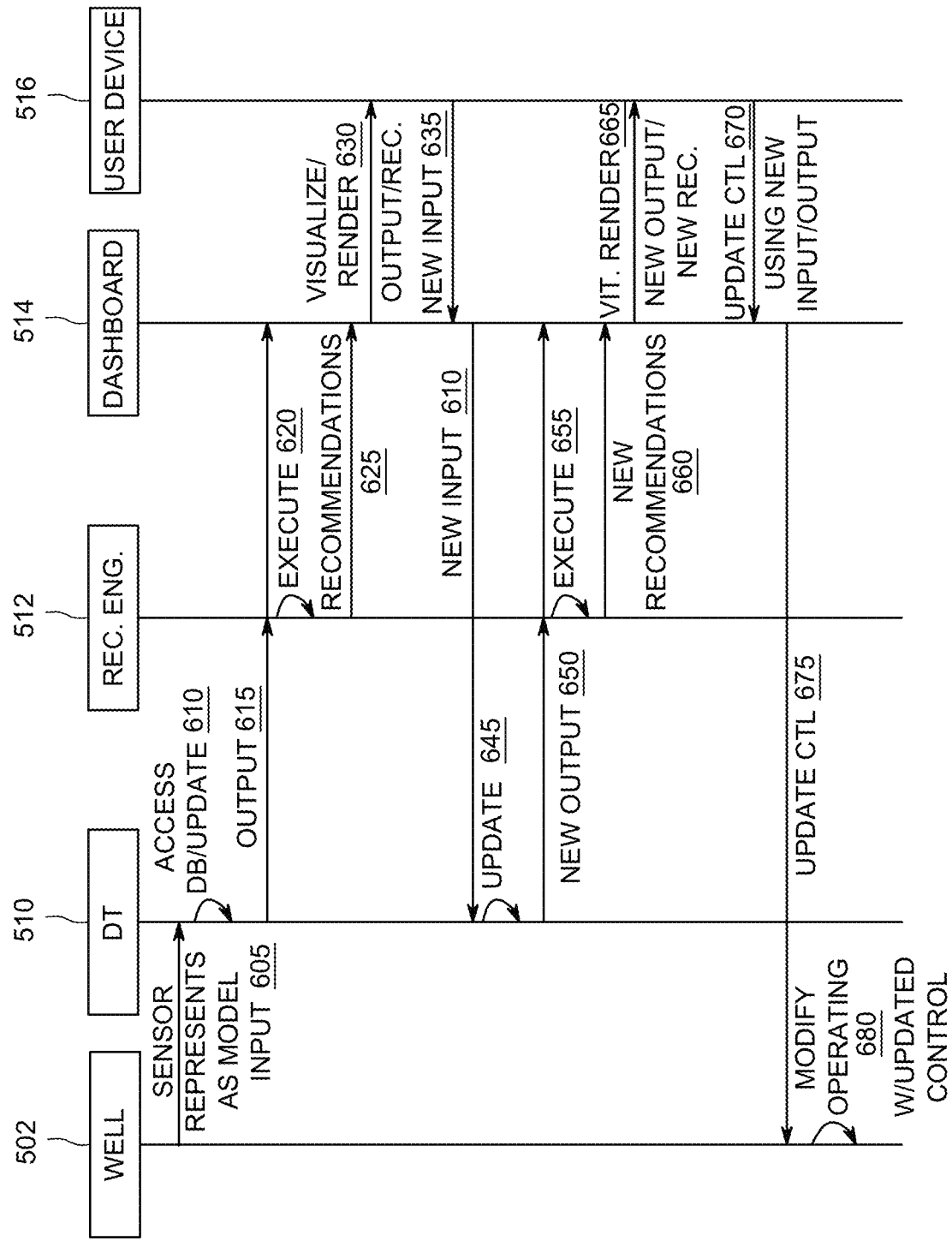
FIG. 6 illustrates an exemplary data flow diagram of the system described in FIG. 5.

FIG. 6 illustrates an exemplary data flow diagram of the block diagram described in FIG. 5. At 605, the operational parameters of the oil well 502 detected by the sensors 504 is communicated to the DTV system 510. At 610, the DTV system 510 can calculate the pump characteristics based on one or more of the operational parameters. At 615, the pump characteristics are communicated to the recommendation engine 512 and the dashboard 514. At 620, the recommendation engine 512 can calculate the recommendation, for example, based on pump characteristics from the DTV system 510. At 625 the recommendations can be communicated to the dashboard 514 that can generate visual representation for the recommendation, operational parameters, pump characteristics and graphical objects to receive inputs from the user. The visual representation can be communicated to the user device at 630. At 635, the user device 516 can communicate the inputs received from the user to the dashboard 514, which can communicate the received input to the DTV system 510 (at 640). At 645, the DTV system 510 can update by recalculating the pump characteristics. At 650, the recalculated pump characteristics can be communicated to the recommendation engine 512 and the dashboard 514. At 655, the recommendation engine 512 can calculate a new recommendation (e.g., based on the recalculated pump characteristics). At 660 the new recommendation can be communicated to the dashboard 514. The dashboard 514 can generate visual representations for the new recommendation, new operational parameters, new pump characteristics, and a new graphical object to receive inputs from the user. The visual representations can be communicated to the user device at 665. At 670, the user device 516 can communicate the inputs received from the user to the dashboard 514 to the control system 506 (at 675). At 680, the control system can modify the operational parameters of the oil pump in the oil well 502. For example, rate of rotation (frequency) of a motor in the oil pump can be increased/decreased, a gate in a valve associated with the oil pump can be moved (e.g., opened, closed, and the like). In some implementations, the control system can store/alter/modify operating parameter values in an oil pump database. The stored/altered/modified operating parameter values can be used to operate the oil pump (e.g., at a later time).

Figure 7:
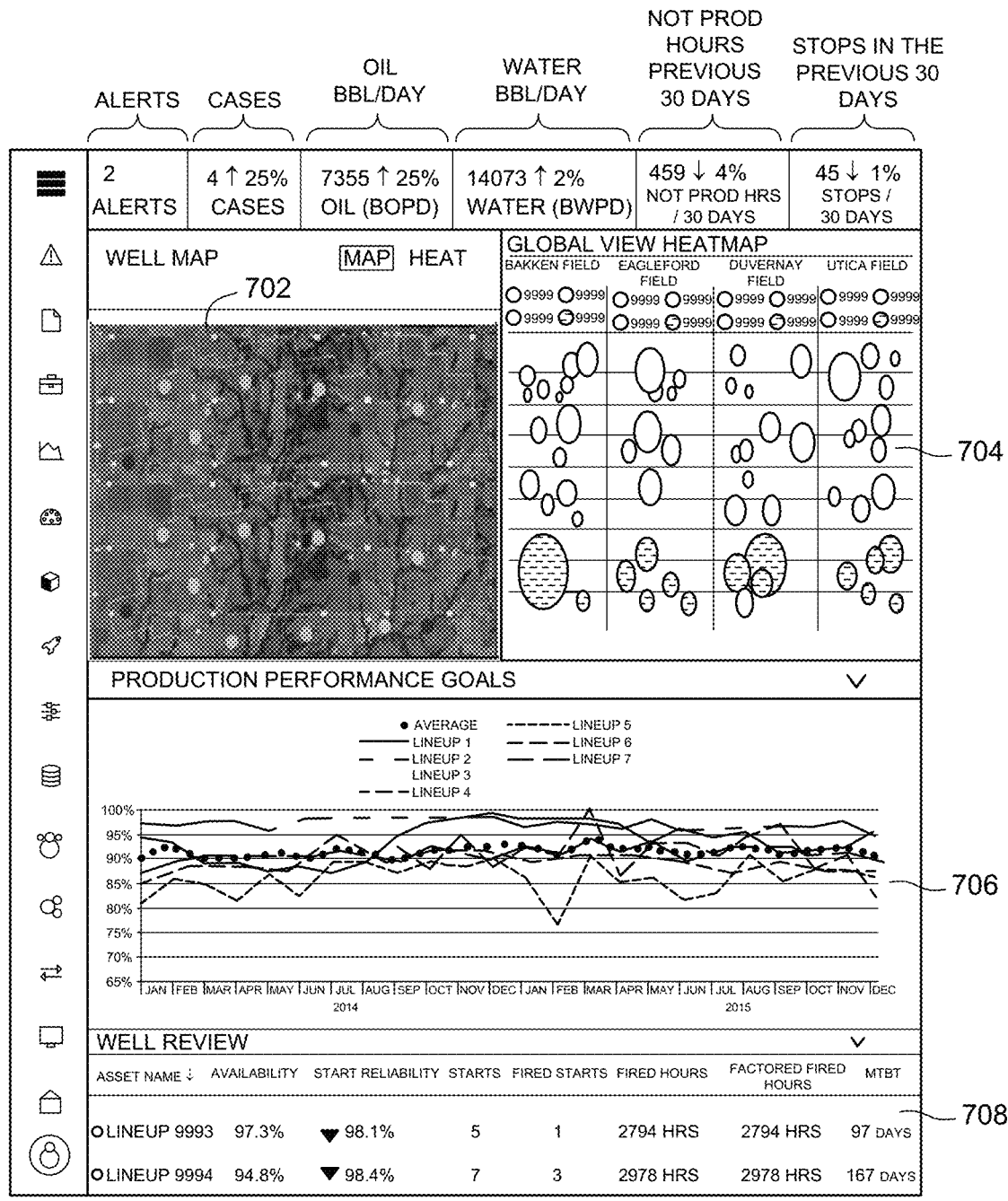
FIG. 7 illustrates an exemplary dashboard overview interface of the graphical user interface display in FIG. 2.

FIGS. 7-13 illustrate various interfaces associated with the graphical user interface in FIG. 2. For example, interfaces in FIGS. 7-13 can be accessed by clicking on the various icons in the vertical taskbar of the GUI in FIG. 2. FIG. 7 illustrates an exemplary dashboard overview interface of the GUI display in FIG. 2. A user can access the dashboard overview by clicking on the "dashboard" icon after, for example, the user receives a communication (e.g., text message, email, and the like) from the monitoring system The dashboard overview can provide a well map 702 that can include the location of various wells in a geographical area. The dashboard overview can include a global view heatmap 704 of the various wells, and production performance goals 706 of the various wells over a period of time. The dashboard overview can also include a review 708 of the various wells.

Figure 8A:
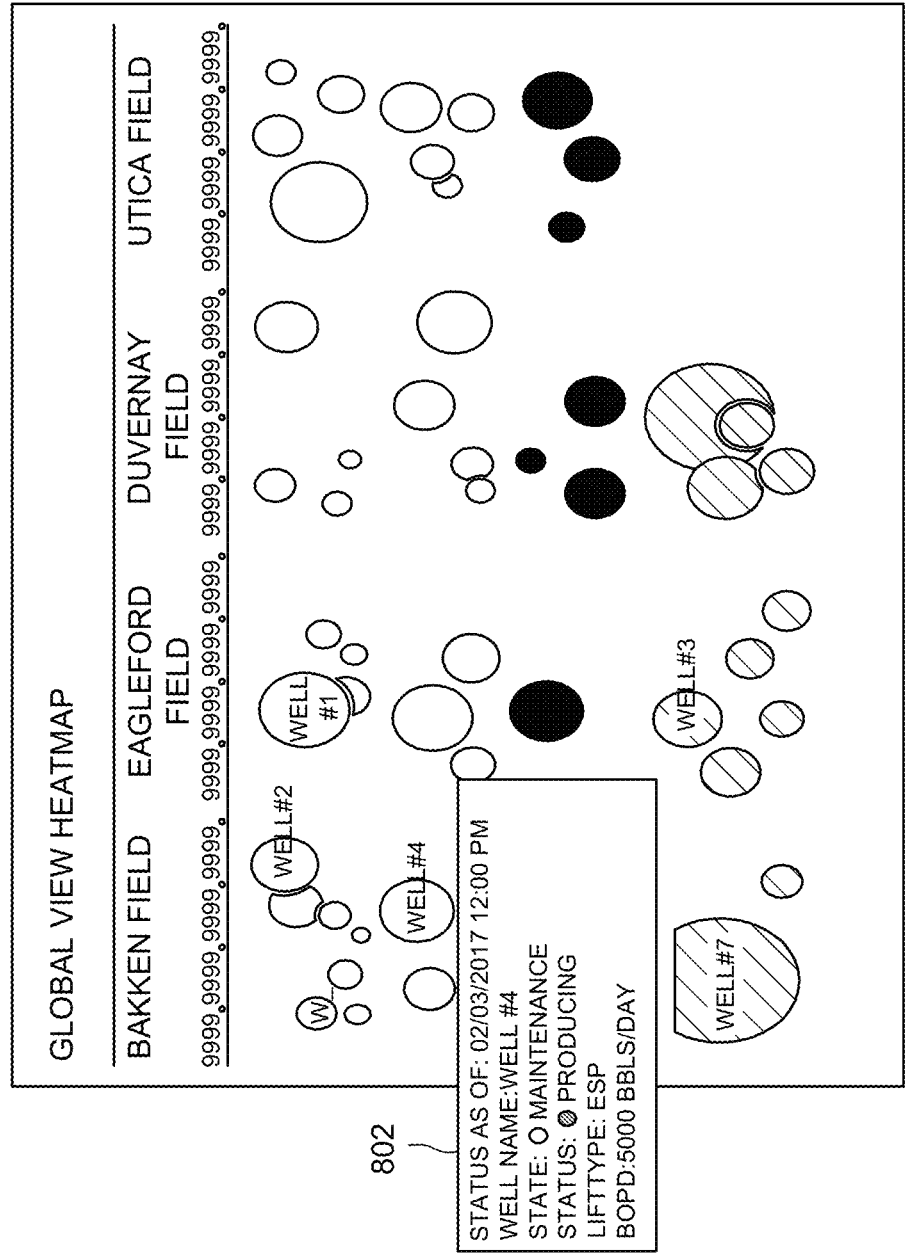
FIG. 8A illustrates an exemplary global view heatmap of the dashboard overview interface in FIG. 7.

FIG. 8A illustrates the exemplary global view heatmap 704 of the dashboard overview interface in FIG. 7. The global view heatmap can indicate to a user oil production associated with various wells. For example, the global heat map can indicate the status of the well. Icons can be arranged into columns based on different oil fields such that wells belonging to the same field reside in a common column. Icons can be arranged into rows based on a status of each well such that underperforming wells are located in towards the top of the heatmap and optimized wells are located towards the bottom of the heatmap. A status of a well can also be indicated by a color of the icon (e.g., blue, red, and yellow to indicate a respective status). The size of each icon can be proportional to the total output.

The user can obtain further information of a well by clicking on an icon representative of the well. This can result in a pop-up box (e.g., popup box 802) that can include the name of the well, well status, well state, and the data and time of detection of operational parameters associated with the oil well. The pop-up box can also include oil well key performance indicator (KPI) (e.g., the total number of barrels of oils produced daily).

Figure 8B:
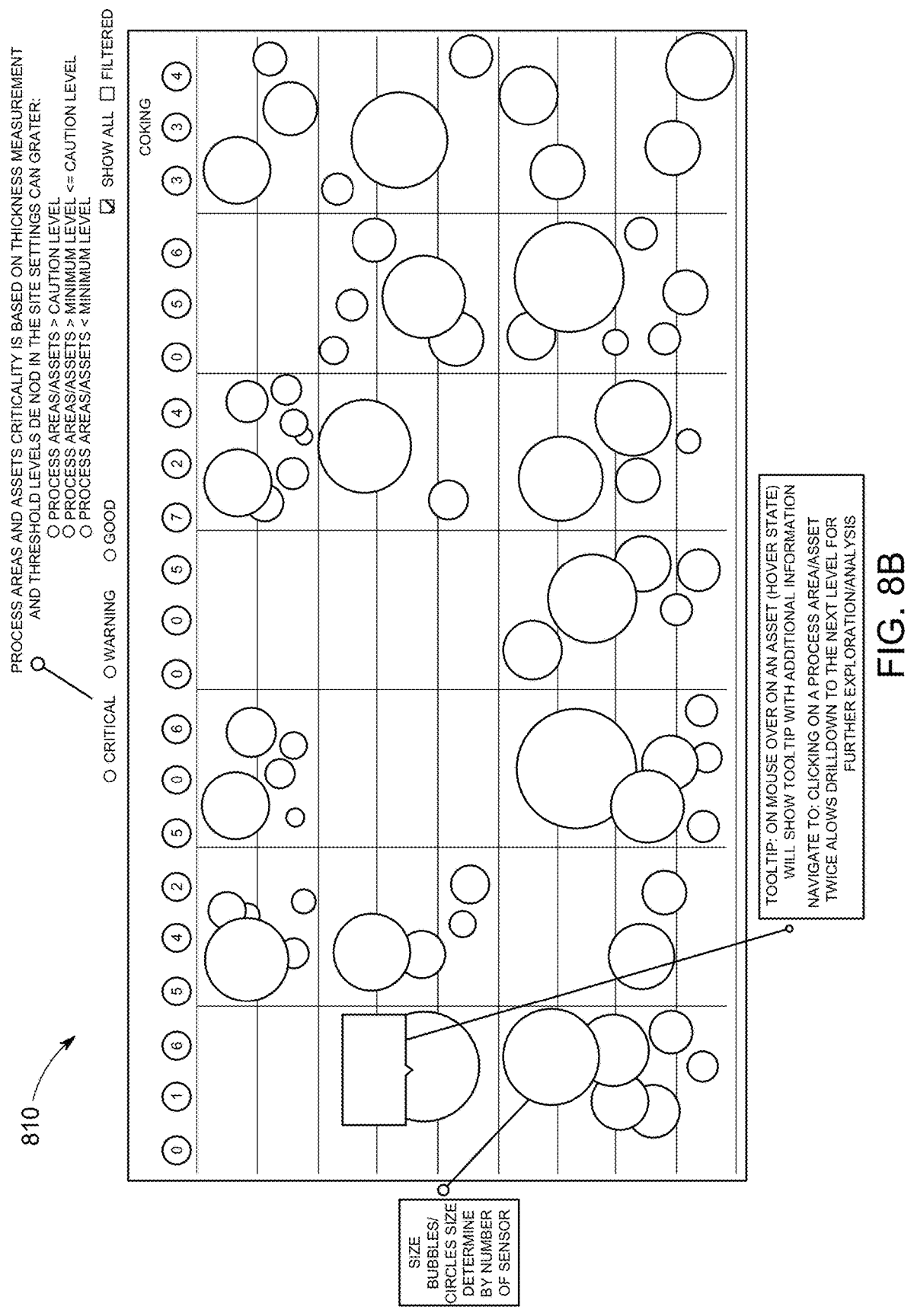

FIG. 8B illustrates another exemplary global view heatmap 810 of the dashboard overview interface in FIG. 7. The heatmap 810 in FIG. 8B can provide information (e.g., wall thickness KPI) related to corrosion of assets (e.g., pipes, sections, etc.) in oil fields. The degree of corrosion level can be represented by the color of an icon representing the asset. The size of the icon can represent the number of sensors associated with the asset that can detect the corrosion level.

Figure 8C:
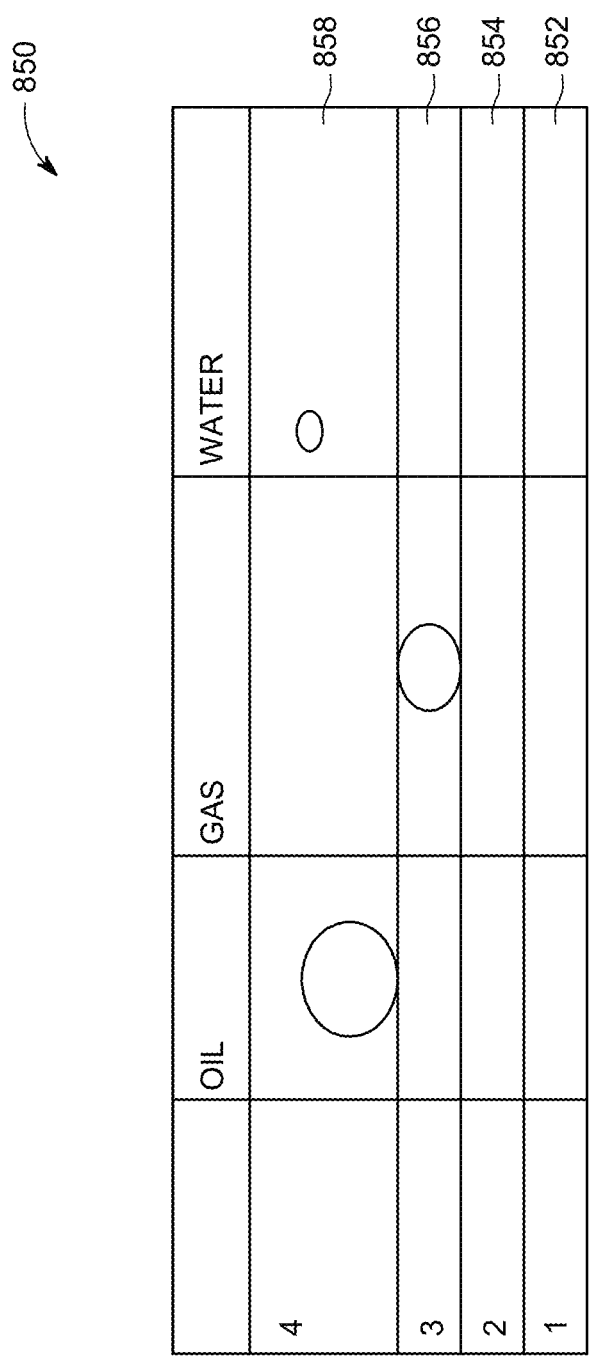
FIG. 8C illustrates another exemplary global view heatmap of the dashboard overview interface in FIG. 7.

FIG. 8C illustrates another exemplary global view heatmap 850 of the dashboard overview interface in FIG. 7. This heatmap 850 can be used for system wide alert tracking on various sub systems of the platform/assets (e.g. Vapor Recovery Unit). The rows 852-856 can depict the Alert severity, and the columns can depict the sub system (e.g. sub system related to oil, gas, water, etc.). Each cell entry can represent a bubble whose size is determined by the number of alerts for the subsystem and Alert severity level.

Figure 9:
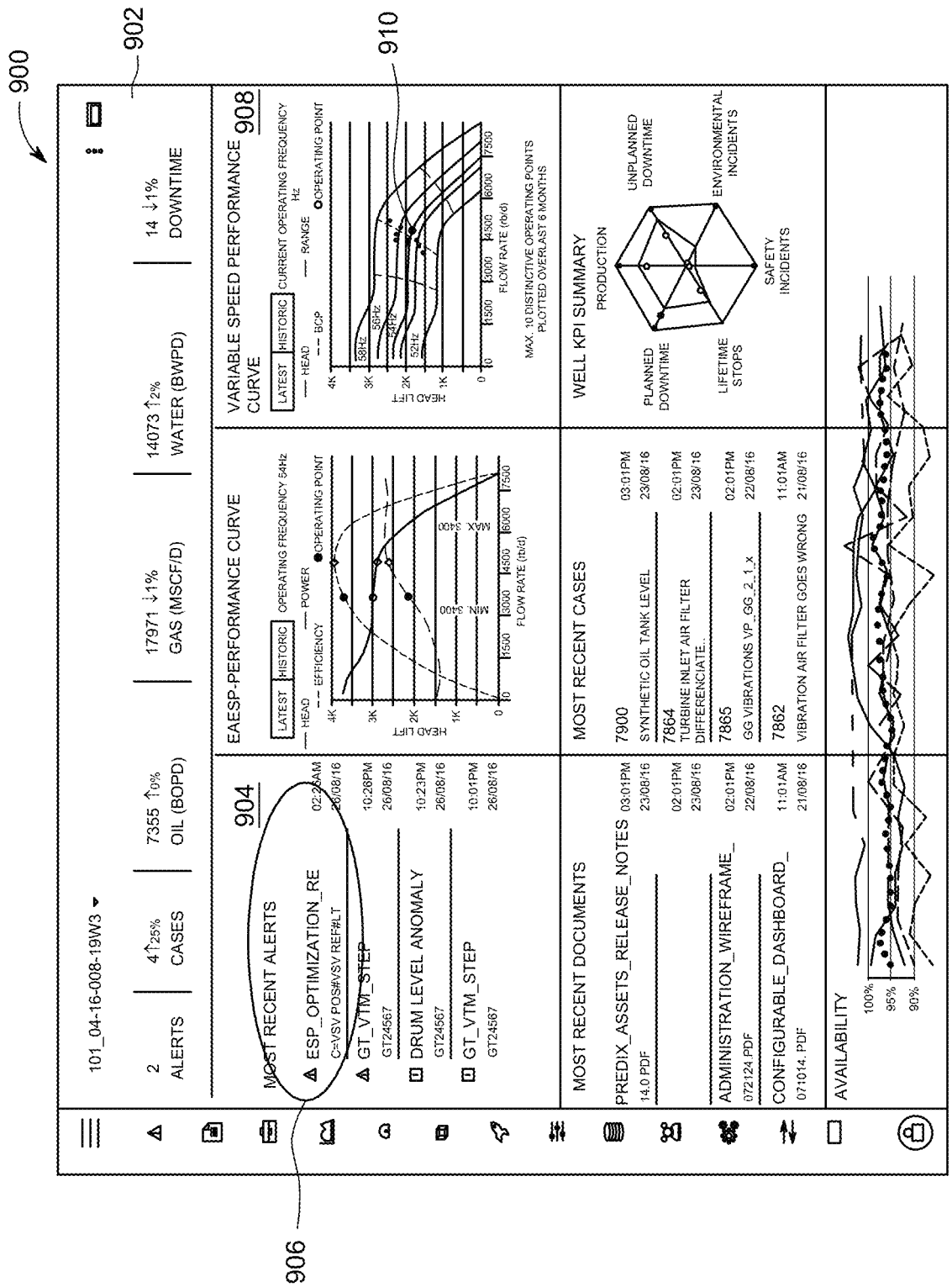
FIG. 9 illustrates an exemplary well dashboard interface of the graphical user interface display in FIG. 2.

FIG. 9 illustrates another exemplary well dashboard interface 900 of the graphical user interface display in FIG. 2. In this interface, the user can inspect the overall status of the well from the Well KPI that can be located in a horizontal taskbar 902. The user can inspect the status of the well through a "trend widget" that includes trends of operational parameters and pump characteristics of the oil well. The Well dashboard can also include recommendation alerts 904. The user can access the recommendation report associated with the recommendation alert by clicking on the recommendation alert icon (e.g., alert icon 906).

The variable speed performance curve widget can illustrate the current and historical operating point for variable speed performance 908. For example, the current operating point is illustrated as a dark circle and historical operating points are illustrated as lighter circles (e.g., circle 910). The intensity or darkness of the operating point relates to how recent the historical operating point is. For example, lower intensity points occurred before higher intensity points. The historical operating points can be time series data.

Figure 10:
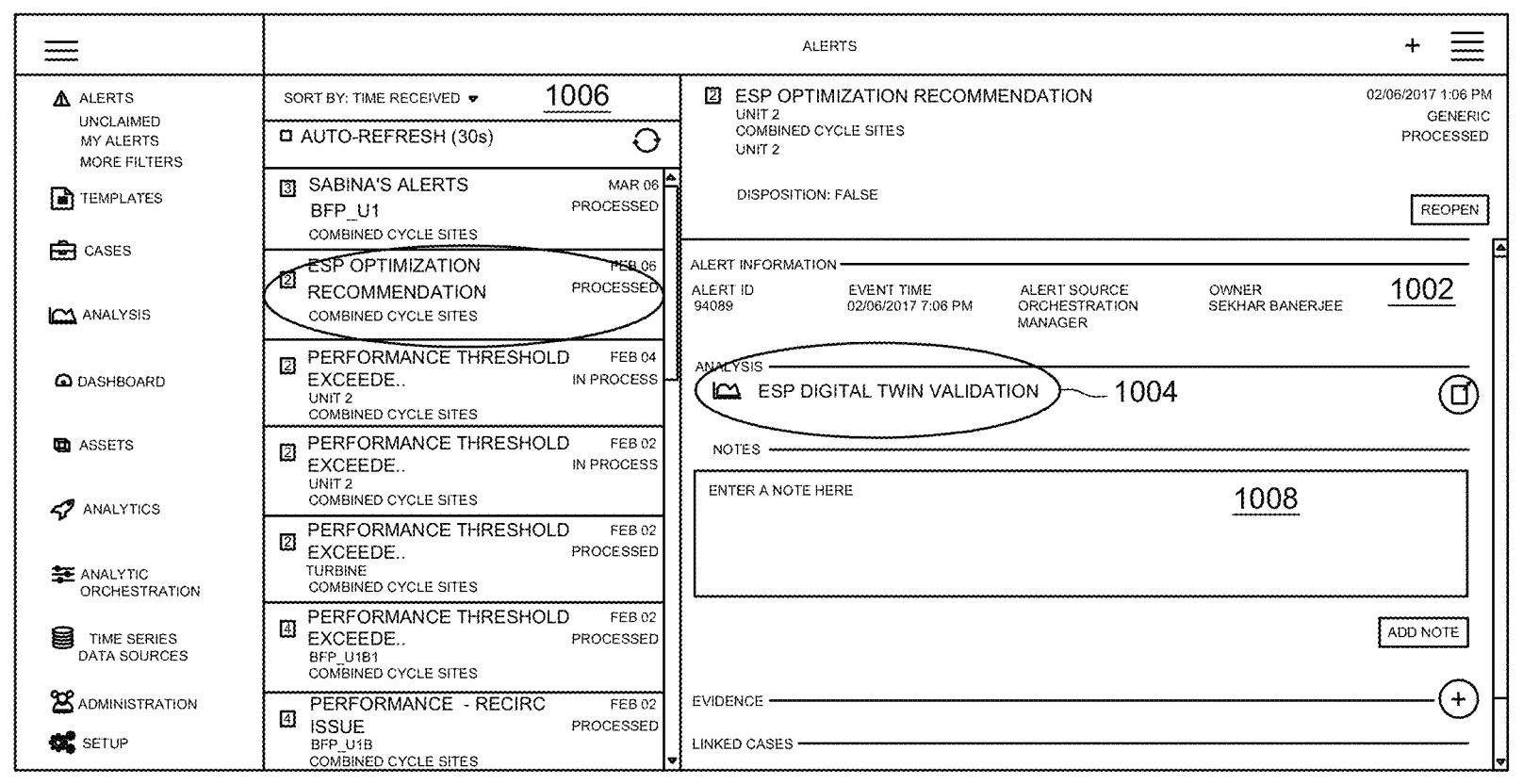

FIG. 10 illustrates an exemplary alert details interface 1000 of the graphical user interface display 200 in FIG. 2. The alert details interface can include recommendation alerts 1002 and a link 1004 to the recommendation report associated with the recommendation alert. The interface 1000 can include an alarm list 1006. The alarms in the alarm list can be arranged, for example, in chronological order (e.g., based on the time at which the alarm was issued). The alarm list can also include information about the status (e.g., process, in process, etc.) of the various alarms. The interface 1000 can include a notepad 1008 that can allow the user to enter notes (e.g., comments related to the alarm).

Figure 11:
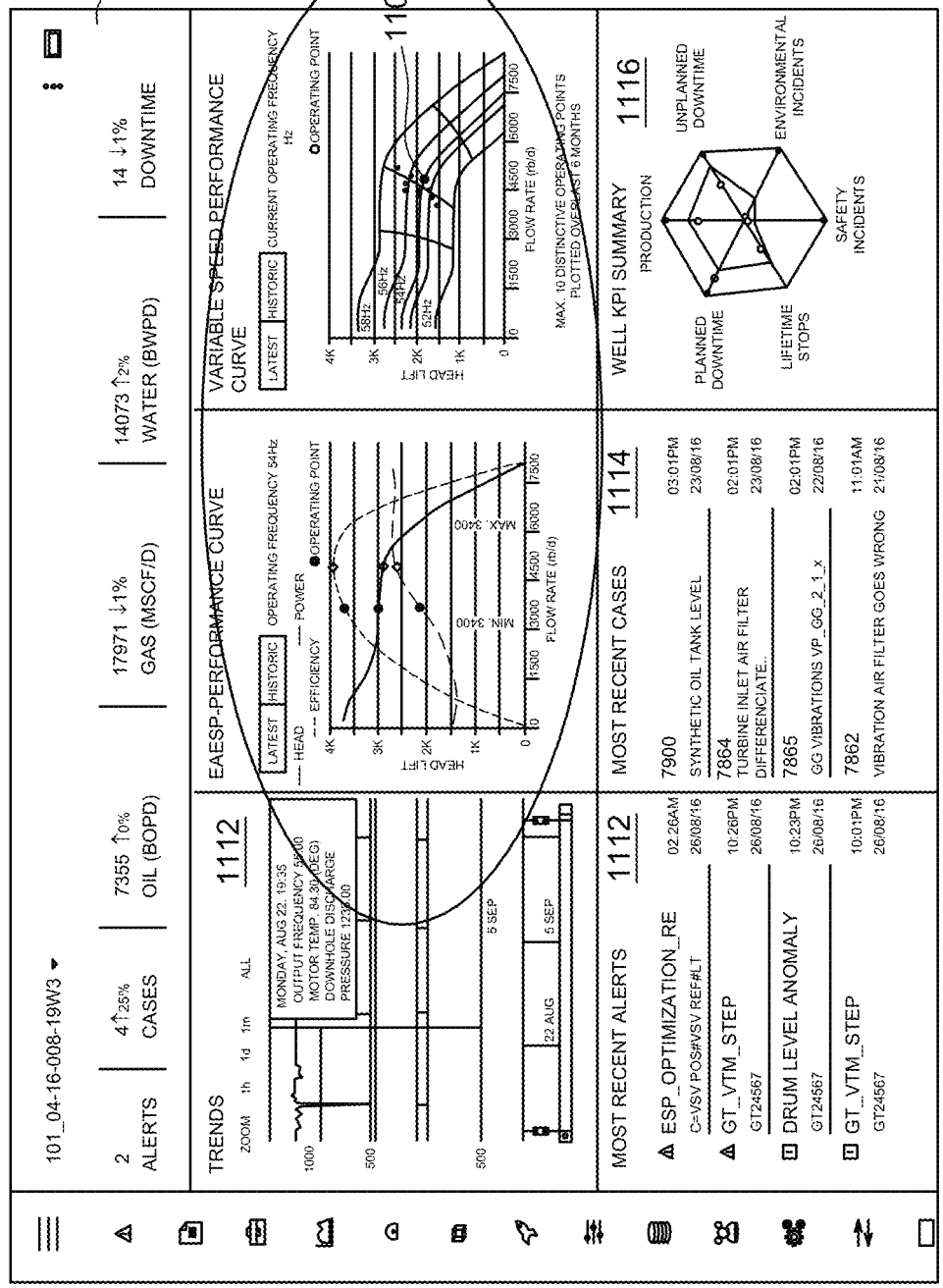
FIG. 11 illustrates another exemplary well dashboard interface of the graphical user interface display in FIG. 2.
Figure 12:
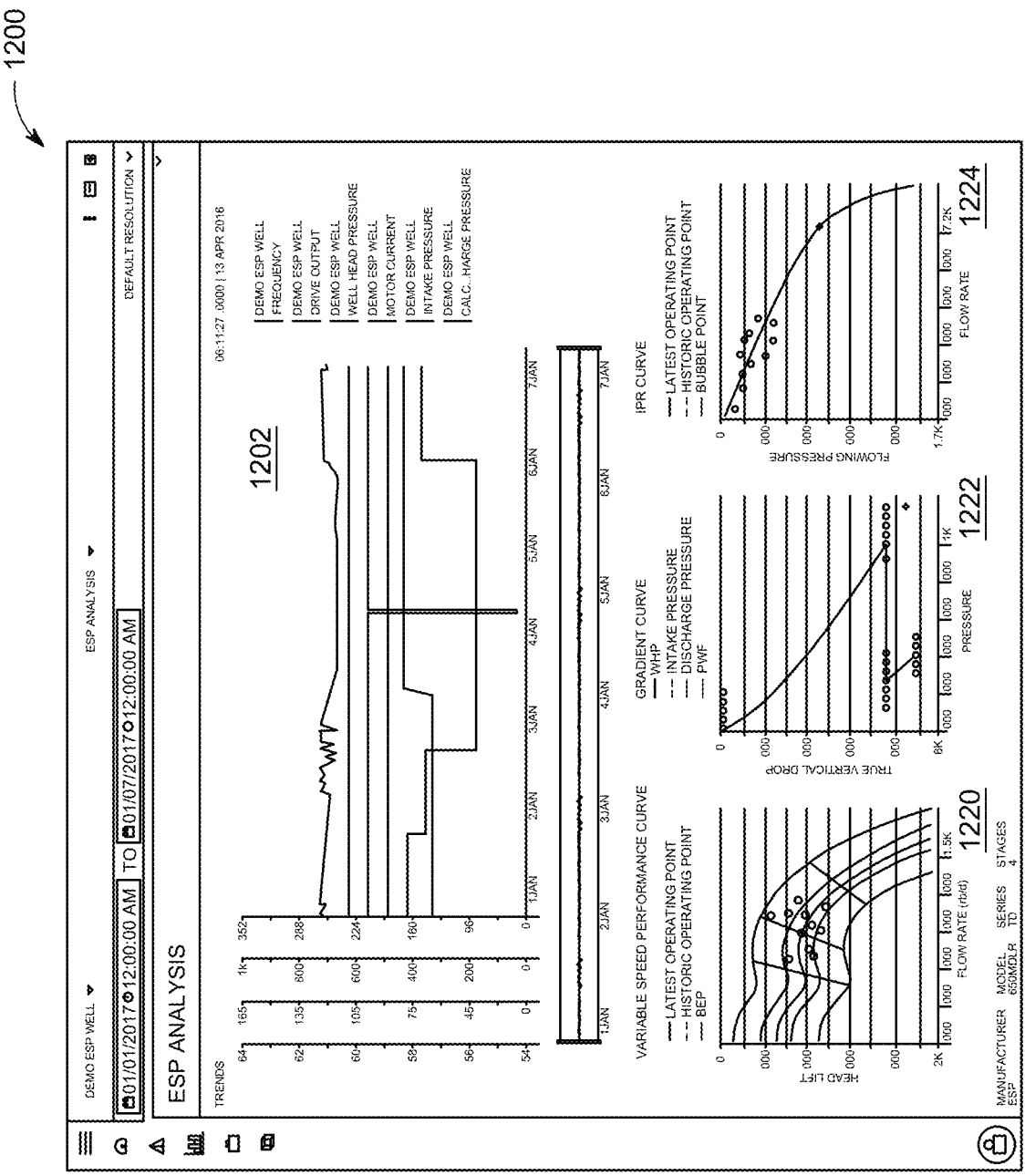
FIG. 12 illustrates an exemplary analysis interface of the graphical user interface display in FIG. 2.

FIG. 11 illustrates another exemplary well dashboard interface 1100 of the graphical user interface display in FIG. 2. In this interface, the user can inspect the pump characteristics that can be presented in the form of graphical display (e.g., plots 1102). The well dashboard interface can present a new operating point (e.g., point 1104) of the oil pump (e.g., based on inputs provided by the user or another user). The user can click on the graphical display for more analysis (e.g., as shown in FIG. 12) of the pump characteristic (e.g., in a different interface). The interface 1100 can also include a horizontal taskbar 1106 that can allow the user to inspect various operating parameters of the well (e.g., oil/gas/water production, downtime, etc.) The interface 1110 can also include trends 1112 (e.g., historical plots) of various pump characteristics, recent alerts 1114, recent cases 1116 and well KPI summary 1118.

FIG. 12 illustrates an exemplary analysis interface 1200 of the graphical user interface display in FIG. 2. The analysis interface can include plots for various pump characteristics. The analysis interface can also include plots 1202 of operational parameters received from the sensors coupled to the oil pump (e.g., in real-time, updated periodically (e.g., every thirty seconds), and the like). The interface 1200 can also include variable speed pump curve 1220, gradient curve 1222, IPR curve 1224 plotted with respect to flow rate, pressure and flow rate, respectively.

FIG. 13 illustrates an exemplary controls interface 1300 of the graphical user interface display in FIG. 2. The controls interface can allow the user to control the operating signal sent to the control system of the oil pump in the oil well. For example, as shown in FIG. 13, the user can change the operational frequency of the "Hudson Well" 1302 at increments of 1 Hertz. This can be done, for example, via an input panel 1302. The input panel 1302 can allow the user to increase/decrease the operation frequency by clicking on the "+" and "−" tabs in the input panel 1302. In some implementations, the adjustment or change in input can be populated from the interface of DTV system. Interface 1300 can provide the status 1306 of the well 1302. Interface 1300 can allow the user to switch-on/switch-off the well via a tab 1308.

Oil/gas production can include a complex combination of several sub-processes that can be related to various units of the oil production system. For example, the oil production system can include crude distillation unit, control valves, reservoir, casing unit, pumps, tubing unit and the like. Liquefied Natural Gas ("LNG") production system can include wells, slug catcher unit, condensate column unit, condensate tank unit, CO2 separator unit, and the like. The overall oil/gas production can be improved by improving one or more of sub-processes. A sub-process can be improved by providing a user with what-if scenarios for the sub-process in an automated or semi-automated manner. In the what-if scenario, operating parameters (e.g., state parameters, user configurable parameters, and the like) of the sub-process can be tweaked to identify the parameter values that can improve the overall oil and gas production.

Figure 14:
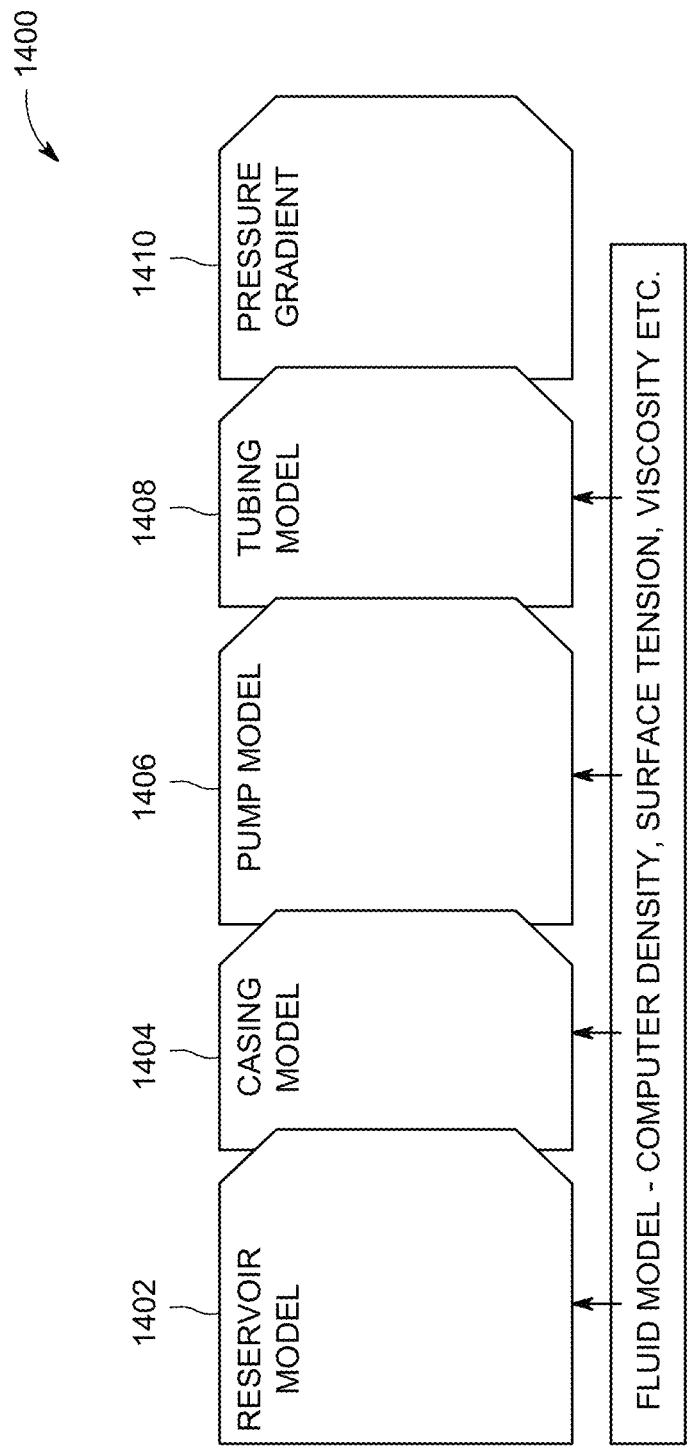
FIG. 14 illustrates an exemplary model of a digital twin validation system.

FIG. 14 describes an exemplary model 1400 that can improve the overall oil production of a well by providing what-if scenarios for various sub systems in a robust and automated way. The model 1400 can guide a user to improve oil production, and consequently improve the profitability and provide a competitive edge. The model 1400 can include sub-models for various sub-units: reservoir model 1402, casing model 1404, pump model 1406, tubing model 1408, and pressure gradient model 1410. A user can follow the workflow shown in FIG. 14 to improve the operation of each of the sub-units. Operating parameters for one or more the sub-models can be tuned and calibrated (e.g., automatically by an optimizer solution program that uses various predetermined ranges of operating parameter values, manually by the user in a trial and error approach, and the like). The user can monitor and visualize the efficiency of the various sub-processes and/or the efficiency of the entire process (e.g., by monitoring barrels per unit of horse power consumed).

Model 1400 can be executed automatically on a periodic basis, or upon triggering by an event defined by the user. A user can identify a "global" oil production optimum by running the what-if scenarios for each sub-model by providing values for operating parameters in the sub-models. Operating parameters can be provided, for example, via move the sliding bar 212 and/or 214 in FIG. 2. The user can verify these parameters by evaluating the impact of the recommendations and either accept or reject them. For example, the user can change the RPM of the ESP (e.g., by moving a sliding bar associated with the RPM of the ESP). The user can generate pump curves based on the revised value of the RMP (e.g., by clicking on the "Update Control" button 250 in FIG. 2). The user can review the pump curves (e.g., curves 234-238) before accepting the changes.

Figure 15:
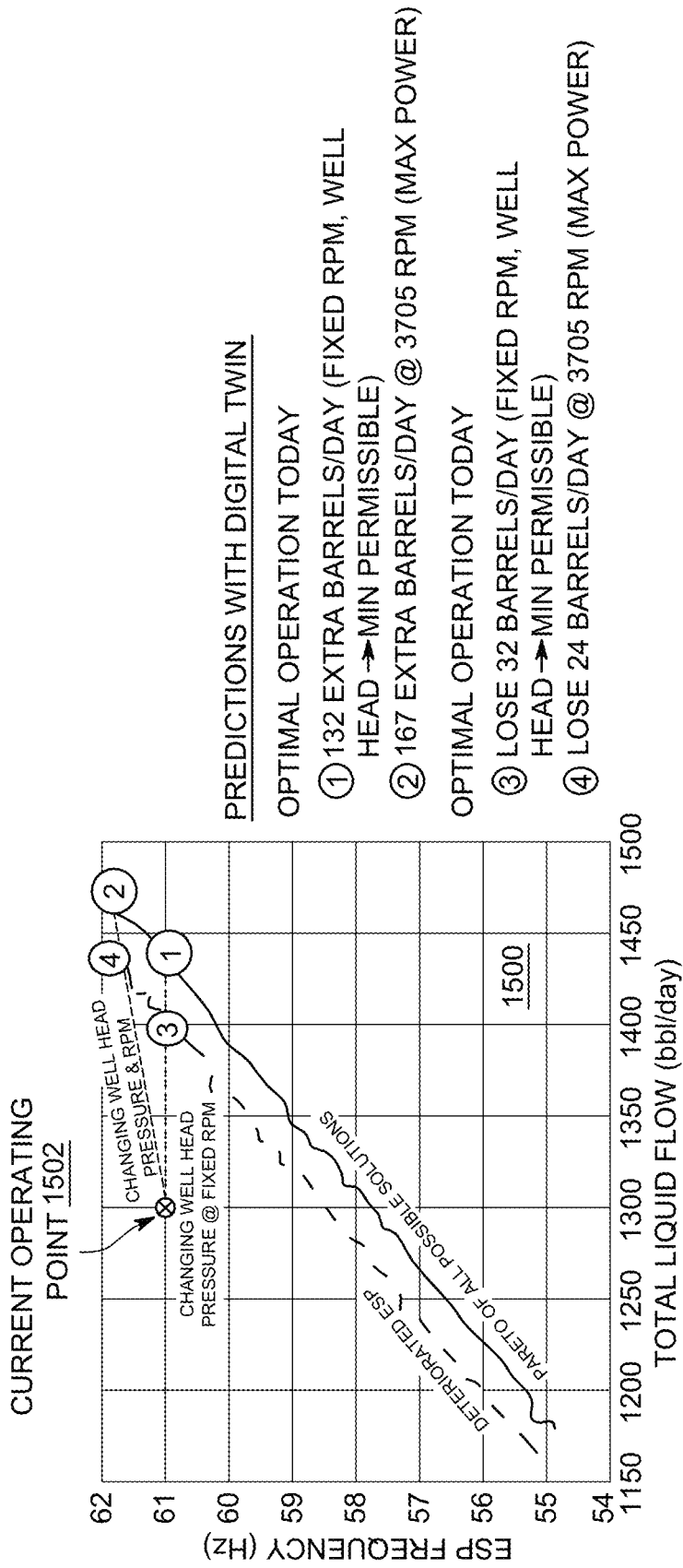
FIG. 15 illustrates an exemplary evolution of global operating point.

FIG. 15 illustrates a plot 1500 of the global oil production can change based on changes in operational parameters. For example, as an operating point 1502 which can be related to various operational parameters (e.g., pump frequency, well head pressure, and the like) changes, the prediction of the monitoring system can change. As the operating parameters change, the operating point can move in the plot 1500. For example, translation of the operating point horizontally can indicate a change in the total liquid flow, and translation of the operating point vertically can indicate a change in the pump frequency.

Figure 16:
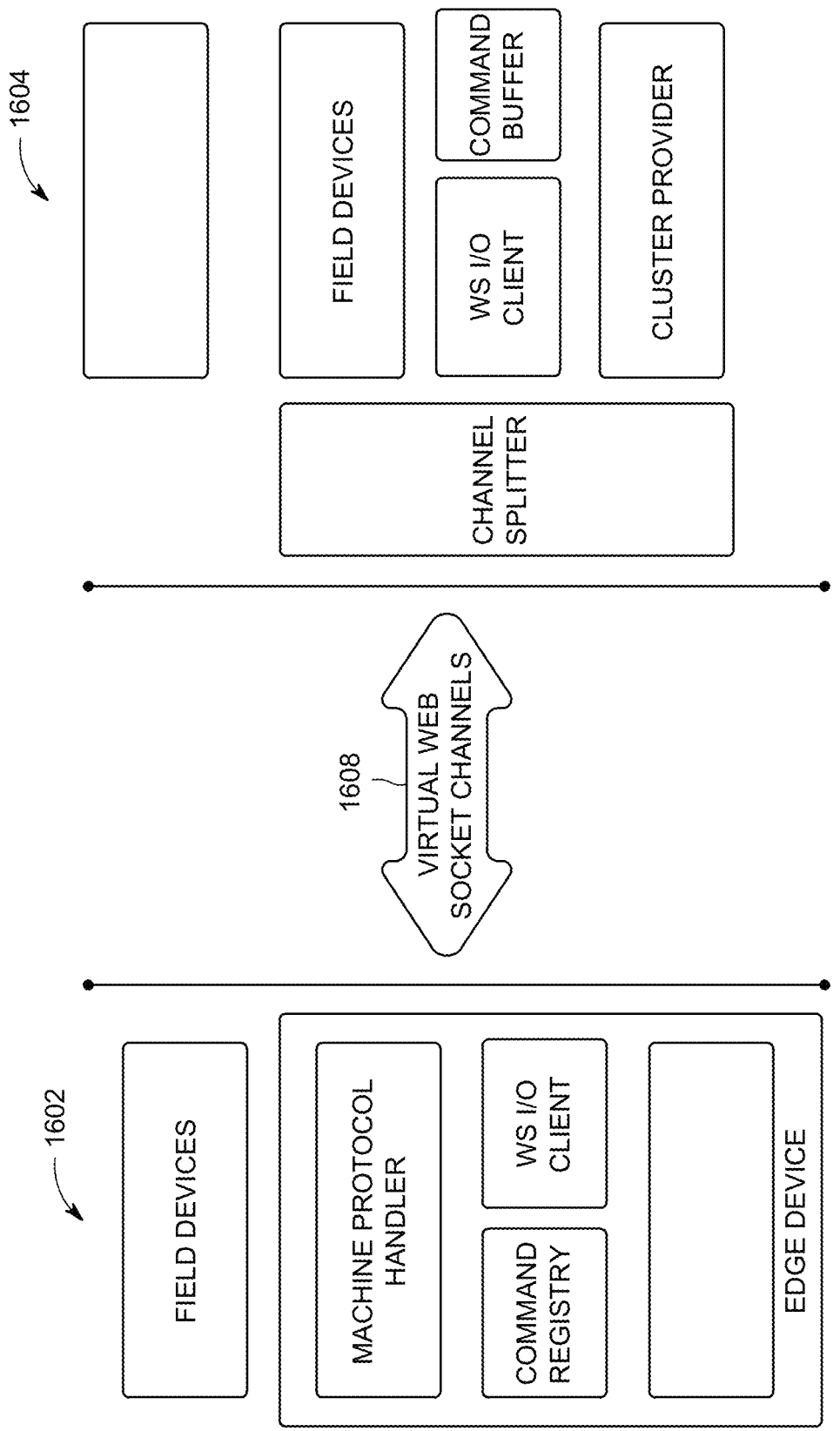
FIG. 16 illustrates an exemplary bi-directional connectivity between an edge device of a user and a cloud platform.

FIG. 16 illustrates an exemplary bi-directional connectivity between an edge device 1602 and a cloud platform 1604 including a digital twin, dashboard, recommendation engine, and the like. The bi-directional connectivity enables the edge device 1602 to avoid opening a listening port on the edge device thereby allowing the bi-directional communication to maintain a high level of security. The edge device can include, for example, a computing system associated with an asset (e.g., oil pump). The edge device can allow the asset to receive a signal (e.g., control signal for changing operational parameters of the asset, signal requesting asset information, and the like).

Bi-directional communication between various intelligent assets operational technologies (OT), and between operational technologies and asset information technology (IT) can allow for collection of information (e.g., operational parameter information), collaboration and centralized asset management, and the ability to monitor asset state and health from the cloud. In addition, the bidirectional communication can allow for monitoring of the edge device status in the cloud (not shown) and can allow for remote control of operational parameters (e.g., control parameters for artificial lift ESP controllers) of the well. Scan commands can be sent to the oil pump (e.g., ESP) from the cloud. Bi-directional communication can allow for set point changes of the controller in the cloud and send the changes to the edge controller.

The bi-direction communication can be based on the combination of software components that utilize the messaging systems and web socket protocol. Cloud side of the bi-directional communication can utilize cloud platform technology stack. An application in the cloud can utilize the 'Channel Provider' APIs 1606 to send the required command to the edge device, which can implement virtual I/O channels 1608 between the edge device 1602 and the cloud using web sockets application protocol (e.g., standard outbound ports 80 and 443). Secure socket layer (SSL) for encryption and edge manager for device registry can ensure end-to-end security. The bi-directional connectivity enables an edge device to avoid opening a listening port on the edge device thereby allowing the bi-directional communication to maintain a high level of security. Edge device can utilize a cloud platform machine framework, which get the commands from the cloud and executes them, to provide the result of the command. Every sub-system in the solution can be highly scalable.

Edge devices can use mobile networks (e.g., partner mobile cellular network) to connect to cloud platform. A private access point name (e.g., IP Address) can be provided to the edge device to communicate over the cellular network. Data can traverse over Mobile Private Network (MPN) up to the carrier data center. Data can be transferred from the carrier data center to cloud platform over internet protocol security (IPSec) virtual private network (VPN). Once the edge device registers with an edge manger in the cloud platform, a web socket connection can be established between the edge device and edge manager running in the cloud. The web socket connection can be kept active by sending a signal at regular interval (e.g., less then 1 KB keep alive packet at every 5 minute interval). No opening of a listening port on the edge device 1602 is needed. A client application running in the cloud can send commands to the edge device manager's command buffers. A web socket I/O server running in the edge device manager can retrieve the commands from the command buffer and push them to the edge device over the web socket connection. The machine protocol handler service running in the cloud platform machine at the edge can interpret the command and translates the hypertext transfer protocol secure (HTTPS) command to a serial protocol (such as Modbus) values to be sent to the filed device.

FIG. 17 illustrates an exemplary graphical user interface (GUI) display 1700 of a digital twin validation. The display 1700 can include information of a multi-well oil field (e.g., oil wells in an oil cluster). The GUI display 1700 can include a horizontal taskbar 1702 that can provide information associated with the multi-well oil field (e.g., number of oil wells under observation by the digital twin validation, cumulative liquid generated by the oil wells in the oil field, cumulative oil, gas and/or water produced by the oil wells in the oil field, and the like), alarms/alerts that have been generated (e.g., by the DTV system), and the like. The GUI display 1700 can also include information (e.g., status, oil pump type, oil well name, liquid, oil, and/or water generated, energy consumed, pump uptime, and the like) associated with the wells in the multi-well oil field. The GUI display 1700 can include a graphical interactive object 1704 that can allow the user to improve (e.g., optimize) the operation of the multi-well oil field.

Figure 18:
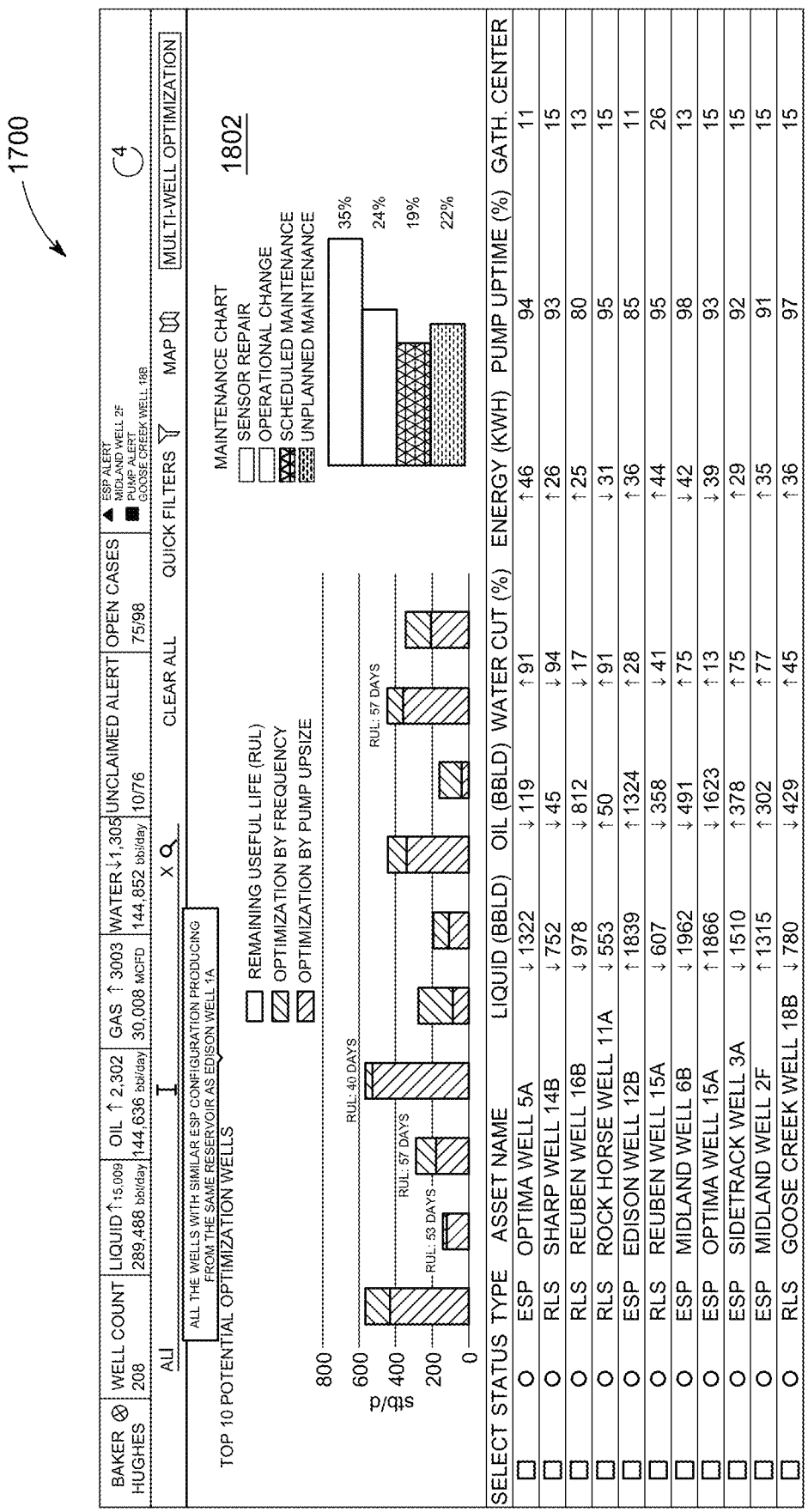
FIG. 18 illustrates the graphical user interface display of FIG. 17 that provides analytical information associated with the multi-well oil field.

FIG. 18 illustrates the graphical user interface (GUI) display 1700 that can provide analytical information associated with the multi-well oil field. For example, the GUI display 1700 can include an information window 1802 that can provide operational information associated with the current and/or projected oil production by one or more wells in the oil field. In one implementation, the informational window 1802 can include information associated with the wells projected to have the largest change in their outputs (e.g., oil generated) due to optimization (e.g., optimization based on pump upsize, pump frequency and the like). The information window 1802 can also include information related to remaining lifetime associated with one or more oil wells. The information window 1802 can also include information associated with the maintenance of the oil wells (e.g., sensor repair, scheduled maintenance, unplanned maintenance, operational change, and the like).

Figure 19:
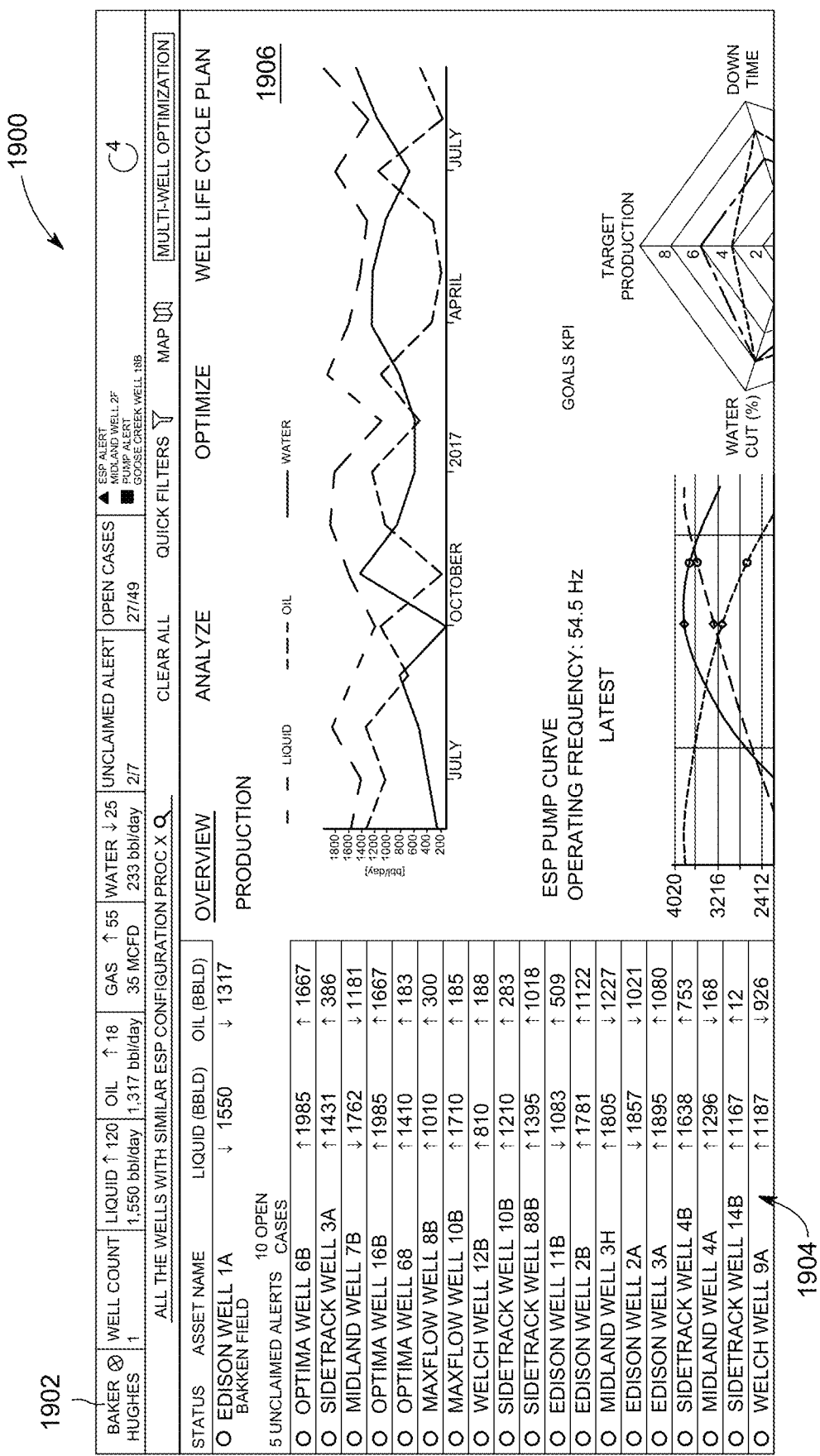
FIG. 19 is an illustration of an exemplary graphical user interface display that can provide information associated with an oil well.

FIG. 19 is an illustration of an exemplary graphical user interface (GUI) display 1900 that can provide information associated with an oil well from a multi-well oil field. The GUI display 1900 can include a horizontal taskbar 1902 that can provide information associated with the multi-well oil field (e.g., number of oil wells in the multi-well oil field, cumulative liquid generated by the multi-well oil field, cumulative gas, oil, and/or water produced by the multi-well oil field, and the like), alarms/alerts that have been generated (e.g., by the DTV system), and the like. The GUI display 1900 can also include a vertical panel 1904 that includes information associated with the wells of the multi-well oil field (e.g., name of the oil wells, liquid and/or oil generated by the wells, and the like). The GUI display 1900 can also include an information window 1906 that can provide operational information of a well of the multi-well oil field. For example, the well whose information is displayed in the information window 1906 can be selected by the user (e.g., by clicking on the name of the well in the vertical panel 1904). The information window 1906 can include a plot of the liquid, oil, and/or water produced by the well (e.g., Edison Well 1A) over a period of time.

Figure 20:
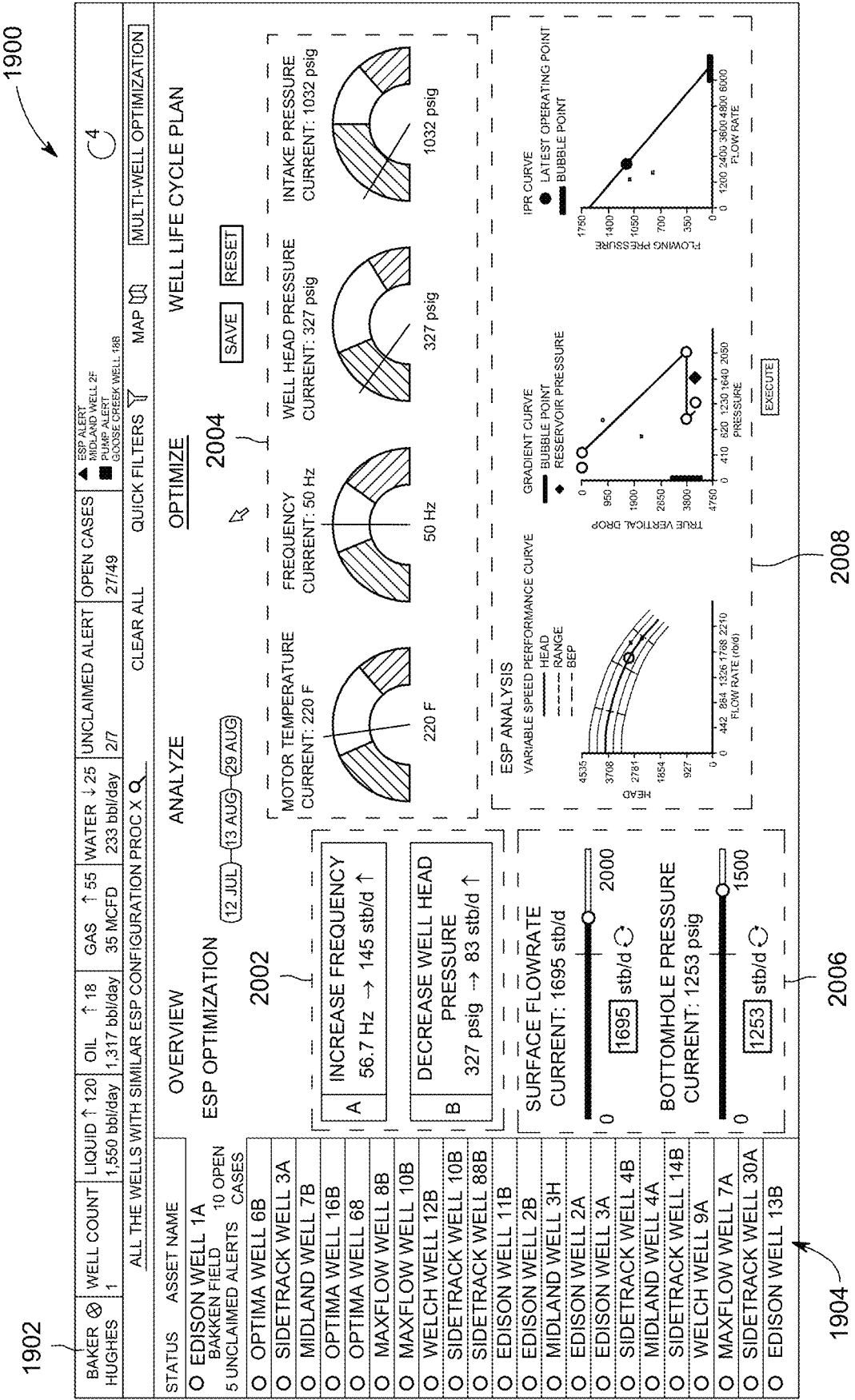
FIG. 20 is an illustration of the graphical user interface display of FIG. 19 that includes recommendation from the digital twins.

FIG. 20 is an illustration of the graphical user interface display 1900 that includes recommendations 2002 for the operation of an oil well (e.g., Edison Well 1A) of the multi-well field (e.g., Bakken Field). The recommendations can be generated by the DTV system. The recommendations can include, for example, increasing the pump frequency, decreasing the well head pressure and the like. The GUI display 1900 can also include an information panel 2004 that includes operational parameter information associated with the oil well (e.g., motor temperature, frequency, well head pressure, intake pressure, and the like). The GUI display 1900 can also include an input panel 2006 which can allow a user to provide input for desired operational parameters of the well. The input panel 2006 can include the current values (and/or range of possible values) for the various operational parameters (e.g., surface flowrate, bottomhole pressure, pump frequency, motor temperature, intake temperature, well head pressure, and the like). The current value can be represented by a vertical black line on a bar gauge representative of the operational parameter. The current value can be representative of the value of the operational parameter measured by a sensor coupled with the oil well. The GUI display 1900 can also include a characteristics output panel 2008. The characteristics output panel 2008 can provide information related to the pump characteristics (which may be calculated using by the DTV system). The information can be displayed in the form of a plot of the pump characteristics versus operational parameter values.

Figure 21:
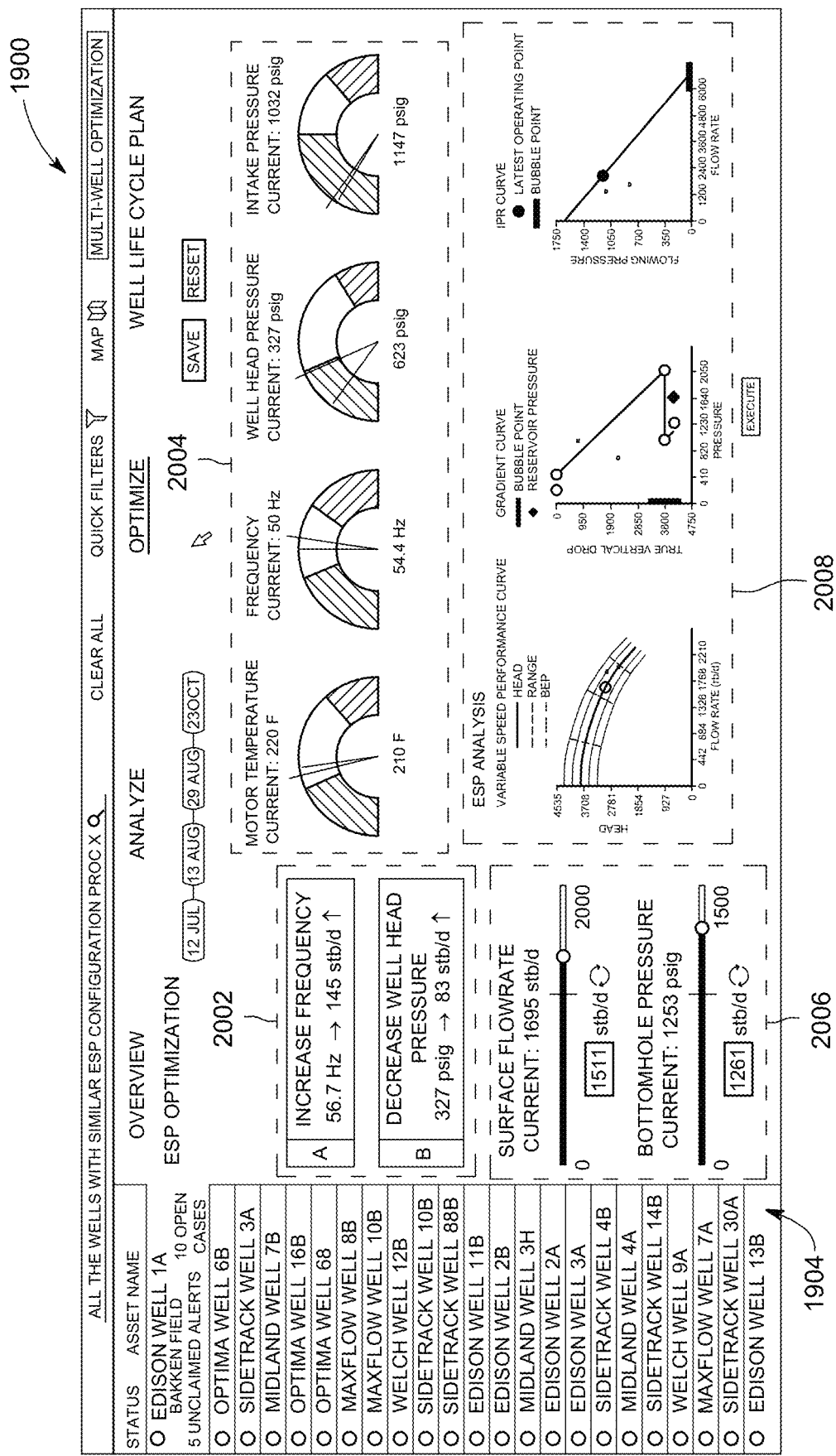
FIG. 21 is an illustration of the graphical user interface display of FIG. 19 where changes to the operation of the well as a result of user input are displayed.

FIG. 21 is an illustration of the graphical user interface display of FIG. 19 where projected changes in the operation of the well due of values for operational parameters provided by the user are displayed. For example, as the user alters the values for surface flow rate and bottomhole pressure in the input panel 2006, the corresponding changes to operational parameters (in information panel 2004) and pump characteristics (in characteristics output panel 2008) are displayed.

Figure 22:
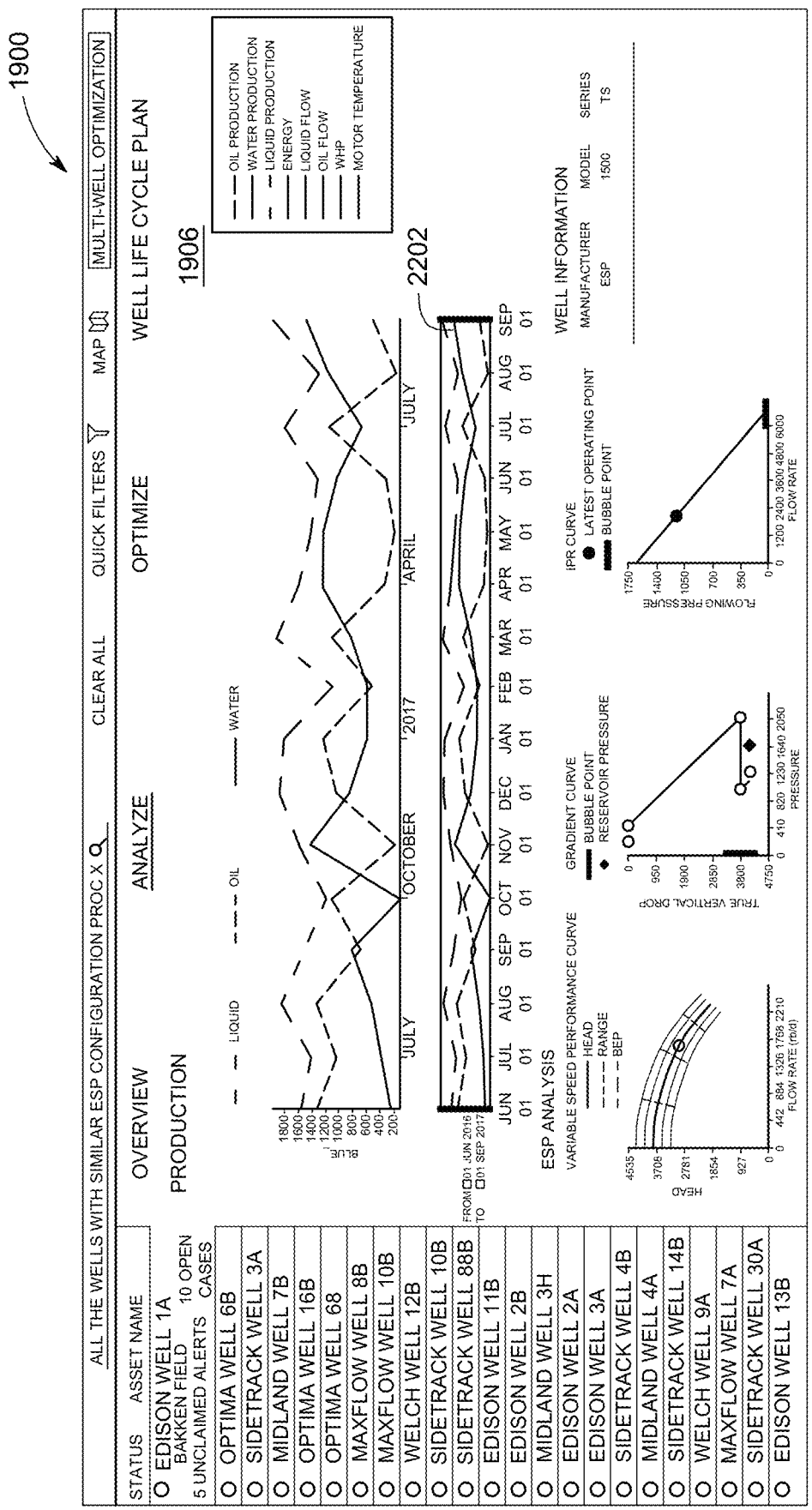
FIG. 22 is an illustration of an exemplary graphical user interface display that allows a user to analyze the operation of an oil well.

FIG. 22 is an illustration of an exemplary graphical user interface display 1900 that allows a user to analyze the operation of an oil well. The GUI display 1900 can include the information window 1906 that can provide a plot of liquid, oil, and/or water produced by the well (e.g., Edison Well 1A) over a period of time. The information window 1906 can include a second plot 2202 of liquid, oil, and/or water produced by the well over a second period of time. The information window 1906 can also include plots for variable speed performance curve, gradient curve, IPR curve, and the like.

Figure 23:
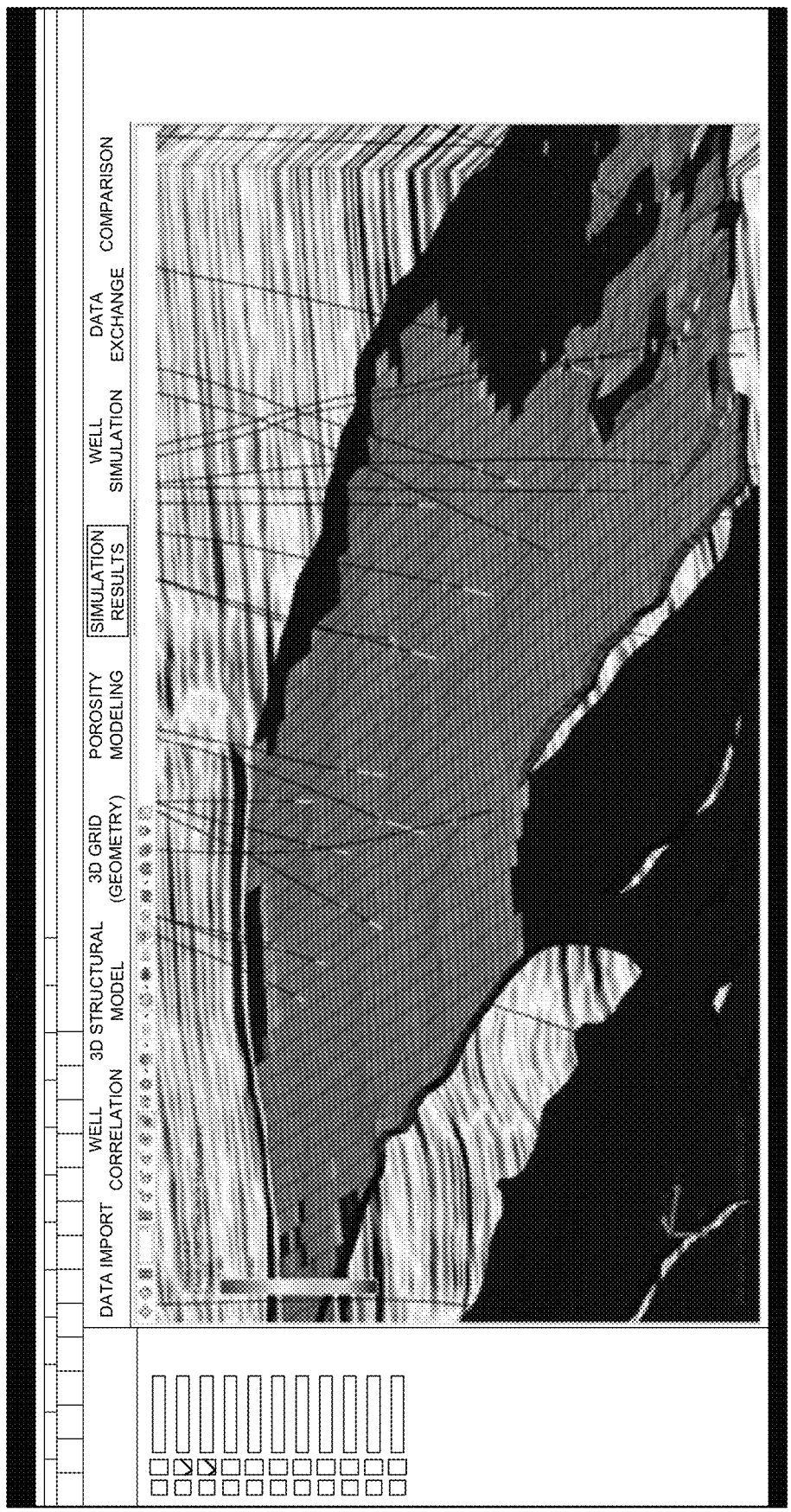
FIG. 23 is an illustration of an oil field map that can provide information related to the oil reserves in the oil field.

FIG. 23 is an illustration of an oil field map that can provide information related to the oil reserves in the oil field. The oil field map can indicate various predetermined sub-regions of the oilfield (e.g., by overlaying a mesh of vertical and horizontal lines on the map of the oil field). The oil field map can also indicate the oil reserves in the various region of the oilfield (e.g., in the sub-regions of the oil field). For example, a color of a region of the oil field can be representative of the oil reserves in that region. A global monitoring system can determine the oil and/or water reserves in one or more regions of the oil field. For example, the global monitoring system can communicate with one or more DTV systems associated with oil wells in the oil field. It can request operational parameters of oil wells (e.g., oil and/or water reserves of the wells) from the DTV system. Based on this information, it can determine the current oil and/or water reserve of the oil field. The global monitoring system can also determine the geographical distribution of the oil and/or water reserves (e.g., oil and/or water reserves for the various sub-regions). The model of the oil field reservoir can be provided to the DTV system for use in determining well operational parameters and for visualization.

Other embodiments are within the scope and spirit of the disclosed subject matter. For example, the monitoring system described in this application can be used oil fields that can include multiple oil wells. The monitoring system can also be used in facilities that have complex machines with multiple operational parameters that need to be altered to change the performance of the machines (e.g., power generating turbines). That is, the present disclosure is not limited to working in the oil and gas field and may be used in other industrial, food service, or consumer settings as well.

Certain exemplary embodiments will now be described to provide an overall understanding of the principles of the structure, function, manufacture, and use of the systems, devices, and methods disclosed herein. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web interface through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

What is claimed is:

1. A method comprising:
    rendering, in a graphical user interface display space, a visual representation of an output value of a digital model of an oil and gas industrial machine, a first interactive graphical object characterizing an input value of the digital model, and a second interactive graphical object;
    receiving data characterizing user interaction with the first interactive graphical object, the user interaction with the first interactive graphical object indicative of the input value of the digital model;
    updating the digital model to generate an updated output value representative of an operational characteristic of the oil and gas industrial machine based on user interaction with the first interactive graphical object;
    generating, based on the updated output value, a recommended value for the input value;
    rendering, in the graphical user interface display space, a first visual representation of the updated output value and a second visual representation of the recommended value
    receiving data characterizing user interaction with the second interactive graphical object, the user interaction with the second interactive graphical object indicative of a request to update one or more operating parameters of the oil and gas industrial machine; and
    setting a value of the operational characteristics of the oil and gas industrial machine to the updated output value.

2. The method of claim 1, wherein the digital model is configured to calculate the output value based on a characteristic mathematical representation of the oil and gas industrial machine, the characteristic mathematical representation includes a system of equations that calculates the output value based, at least in part, on the data characterizing the user interaction indicative of the input value.

3. The method of claim 2, wherein updating the digital model includes updating at least one variable in the system of equations based on the input value and evaluating the updated model to determine the updated output value.

4. The method of claim 1, wherein the first interactive graphical object includes a slide bar configured to be dragged along a predetermined path, wherein the location of the slide bar on the predetermined path indicative of the input value.

5. The method of claim 1, wherein the input value further represents one or more operational parameters of the oil and gas industrial machine and/or a predetermined system coefficients of the oil and gas industrial machine.

6. The method of claim 5, further comprising updating the predetermined system coefficient based on data characterizing user interaction with the first interactive graphical object.

7. The method of claim 1, wherein the oil and gas industrial machine includes one or more of a crude distillation unit, control valves, a reservoir, a casing unit, pumps and tubing unit.

8. The method in claim 1, further comprising communicating data characterizing one or more of the digital model, the input value and the updated output value to a global monitoring system configured to monitor the oil and gas industrial machine.

9. The method of claim 1, further comprising:
    transmitting, to a controller of the oil and gas industrial machine, an instruction to modify operation of the industrial machine, the instruction based on the received data.

10. The method of claim 1, wherein the oil and gas industrial machine is in communication with a machine monitoring platform including the digital model, the communication is via an edge device coupled to an oil and gas machine controller and the edge device is configured to communicate with the machine monitoring platform via a secure socket connection without the edge device opening a listening port.

11. A monitoring system comprising:
    a dashboard including a graphical user interface display space;
    a digital twin validation system configured to perform operations comprising:
        rendering, in a graphical user interface display space, a visual representation of an output value of a digital model of an oil and gas industrial machine, a first interactive graphical object characterizing an input value of the digital model, and a second interactive graphical object;
receiving data characterizing user interaction with the first interactive graphical object, the user interaction with the first interactive graphical object indicative of the input value of the digital model;
updating the digital model to generate an updated output value representative of an operational characteristic of the oil and gas industrial machine based on user interaction with the first interactive graphical object;
generating, based on the updated output value, a recommended value for the input value;
rendering, in the graphical user interface display space, a first visual representation of the updated output value and a second visual representation of the recommended value
receiving data characterizing user interaction with the second interactive graphical object, the user interaction with the second interactive graphical object indicative of a request to update the operational characteristics of the oil and gas industrial machine; and
setting a value of the operational characteristics of the oil and gas industrial machine to the updated output value.

12. A system comprising:
at least one data processor;
memory coupled to the at least one data processor, the memory storing instructions to cause the at least one data processor to perform operations comprising:
  rendering, in a graphical user interface display space, a visual representation of an output value of a digital model of an oil and gas industrial machine, a first interactive graphical object characterizing an input value of the digital model, and a second interactive graphical object;
  receiving data characterizing user interaction with the first interactive graphical object, the user interaction with the first interactive graphical object indicative of the input value of the digital model;
  updating the digital model to generate an updated output value representative of an operational characteristic of the oil and gas industrial machine based on user interaction with the first interactive graphical object;
  generating, based on the updated output value, a recommended value for the input value;
  rendering, in the graphical user interface display space, a first visual representation of the updated output value and a second visual representation of the recommended value
  receiving data characterizing user interaction with the second interactive graphical object, the user interaction with the second interactive graphical object indicative of a request to update the operational characteristics of the oil and gas industrial machine; and
  setting a value of the operational characteristics of the oil and gas industrial machine to the updated output value.

13. The system of claim 12, wherein the digital model is configured to calculate the output value based on a characteristic mathematical representation of the oil and gas industrial machine, the characteristic mathematical representation includes a system of equations that calculates the output value based, at least in part, on the data characterizing the user interaction indicative of the input value.

14. The method of claim 13, wherein updating the digital model includes updating at least one variable in the system of equations based on the input value and evaluating the updated model to determine the updated output value.

15. The system of claim 13, wherein the first interactive graphical object includes a slide bar configured to be dragged along a predetermined path, wherein the location of the slide bar on the predetermined path indicative of the input value.

16. The method of claim 13, wherein the input value further represents one or more operational parameters of the oil and gas industrial machine and/or a predetermined system coefficients of the oil and gas industrial machine.

17. The method of claim 16, wherein the operations further comprising updating the predetermined system coefficient based on data characterizing user interaction with the first interactive graphical object.

18. The method of claim 13, wherein the oil and gas industrial machine includes one or more of a crude distillation unit, control valves, a reservoir, a casing unit, pumps and tubing unit.

19. The method of claim 13, wherein the operations further comprising communicating data characterizing one or more of the digital model, the input value and the updated output value to a global monitoring system configured to monitor the oil and gas industrial machine.

* * * * *